United States Patent
Bleizeffer et al.

(10) Patent No.: US 7,234,118 B1
(45) Date of Patent: Jun. 19, 2007

(54) METHOD AND APPARATUS FOR SETTING PARAMETERS IN A SYSTEM

(75) Inventors: Terry M. Bleizeffer, Santa Cruz, CA (US); Nathan D. Church, Seattle, WA (US); Kathryn W. Devine, Morgan Hill, CA (US); Virginia W. Hughes, Jr., Hollister, CA (US); Barbara J. Kilburn, Saratoga, CA (US); David E. Shough, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/058,170

(22) Filed: Apr. 10, 1998

Related U.S. Application Data

(60) Provisional application No. 60/069,628, filed on Dec. 15, 1997.

(51) Int. Cl.
G09G 5/00 (2006.01)

(52) U.S. Cl. ............... 715/764; 715/765; 715/767; 715/771; 715/772; 715/967; 715/975

(58) Field of Classification Search ............. 345/339, 345/336, 337, 338, 966, 967, 975, 346, 357; 434/118; 715/764–765, 771–772, 967, 975, 715/744, 707, 714, 712, 516, 855, 804, 511; 717/174, 175, 178, 120
See application file for complete search history.

(56) References Cited

U.S. PATENT DOCUMENTS

| | | | | |
|---|---|---|---|---|
| 4,873,623 A | * | 10/1989 | Lane et al. | 700/83 |
| 5,461,716 A | * | 10/1995 | Eagen et al. | 345/157 |
| 5,535,321 A | * | 7/1996 | Massaro et al. | 345/337 |
| 5,673,404 A | * | 9/1997 | Cousins et al. | 345/347 |
| 5,675,756 A | * | 10/1997 | Benton et al. | 345/349 |
| 5,793,368 A | * | 8/1998 | Beer | 345/334 |
| 5,896,138 A | * | 4/1999 | Riley | 345/440 |
| 6,069,629 A | * | 5/2000 | Paterson et al. | 345/349 |
| 6,182,285 B1 | * | 1/2001 | Bleizeffer et al. | 717/11 |

OTHER PUBLICATIONS

W.J. Pelt, B.J. Swearingen and S.A. Wadood, IBM Technical Disclosure Bulletin (TDB) "Preprocessing for Remote Install LAN Requester 1.3" vol. 34, No. 11, Apr. 1992, p. 174.

* cited by examiner

*Primary Examiner*—Tadesse Hailu
(74) *Attorney, Agent, or Firm*—Kenyon & Kenyon LLP

(57) ABSTRACT

A method and apparatus for compensating for deficiencies existing in programs to assist a user through installing a program. Polling the status of jobs requested by the user of a workstation is done so that the user may eventually be provided with status reports regarding the jobs being executed. The user can set parameters during loading of System Modification Program Extended (SMPE) libraries, install, migrate, fallback, remigrate and update procedures for the program. An indication is provided to a user of a workstation as steps of a task have been completed by the user. The health of catalog and directory databases may be verified before a migrate procedure is performed. The user of the program can be informed regarding parameters whose default values have changed, which parameters are of particular concern to the specific user.

48 Claims, 21 Drawing Sheets

METHOD AND APPARATUS FOR SETTING PARAMETERS IN A SYSTEM

This application claims the benefit of U.S. Provisional Application 60/069,628 filed Dec. 15, 1997. This application is also related to the following applications, filed on the same day as the present application: Ser. No. 09/058,171, entitled "Method And Apparatus For Polling Job Status On A Mainframe System"; Ser. No. 09/058,172, entitled "Method And Apparatus Of Indicating Steps In A Task Which Have Been Completed"; Ser. No. 09/058,138, entitled "Method And Apparatus For Performing A Health Check On A Database System"; and Ser. No. 09/058,173, entitled "Method And Apparatus For Generating A Default List."

BACKGROUND OF THE INVENTION

1. Field of the Invention

The present invention relates to a method and apparatus for directing and assisting a user through procedures of a program required to perform various tasks on a complex software system.

2. Description of the Related Art

It is known that the installation of software systems on mainframe computers requires entry of many parameters and accomplishment of a large number of steps before the software is ready to run. During the installation process, an entry error or other mistake can result in substantial time being expended to debug the data that has been entered. The prior art has attempted to cope with this problem through a system that helps the user through the installation process.

One example of such prior art is disclosed in the IBM Technical Disclosure Bulletin (TDB), Volume 34, No. 11, April 1992 at page 174. There, it is noted that a local area network distribution system requires a large number of user actions to set up a workstation to remotely install a local area network (LAN) requester program. Previously, the LAN administrator would be required to create map files manually for all requesters that require remote installation. The IBM TDB article suggests that a preprocessor be used to help the LAN administrator customize the set-up for remote requesters. The preprocessing program creates a map file for each workstation wherein a requestor program is to be installed. For each requester, the LAN administrator inputs the requester's name, domain name and drive where the program will be installed. The preprocessing program reads these input parameters and creates a map file with appropriate default values. The preprocessing program is said to reduce the chance of user error by utilizing predefined inputs and by displaying appropriate error messages.

It is further known to direct a user through the various steps that are required for installing an application program. However, such installation instructions are generally set out as a listed series of tasks to accomplish, with little information being given as to their interrelationship, the status of various subtasks which comprise the overall task, or the overall relationship of the various subtasks to each other and to the task as a whole.

In fact, to successfully install a complex program, it is often a necessity that the user be an expert on how to install the program, on how to adapt and/or alter parameters that are inserted during the installation procedure, etc.

SUMMARY OF THE INVENTION

The present invention overcomes these and other shortcomings of prior systems, by accomplishing the objective of providing an improved method, apparatus and article of manufacture for assisting a user via a program on a workstation, running under an operating system and being connected to a mainframe computer.

More specifically, the present invention provides an improved method, apparatus and article of manufacture for polling the status of jobs requested by the user of a workstation, where the jobs are being executed on a mainframe. The present invention does so by continuously polling to determine when a particular output file is present. When the output file is found to be present, the user is given an indication of the status of the job originally requested by the user.

The present invention also provides an improved method, apparatus and article of manufacture for assisting the user in setting parameters during loading of System Modification Program Extended (SMPE) libraries, installation, migration, fallback, remigration and update tasks of a program. Loading of SMPE libraries refers to a preinstallation which takes place prior to installation. Installation refers to the initial load of a program, while migration refers to moving from an older to a newer version of the program. Fallback is used to return to a state where the older version of the program is operational without uninstalling the newer version. Remigration is used to return to the newer version of the program when the reason for the fallback is resolved. Finally, an update is used to provide upgrades in the current version of the program.

When the user is in the process of setting parameters, the user is initially asked to choose one of two options to select system parameters. If the first option is selected, the user is presented with a series of information windows regarding the parameters. Within each of the windows, the user may select to change the associated parameter. If the user chooses to change the associated parameter, the system goes from the information window to a predefined window in which the parameter can be changed. Once this is done, the user is returned to the information window last viewed by the user. If the second option is used, the user is given a list of the predefined windows, each of which may be selected by the user to change an associated parameter.

The present invention also provides an improved method, apparatus and article of manufacture for providing an indication to a user of a workstation as steps of a task have been completed. The tasks include load SMPE libraries, install, migrate, fallback, remigrate and update. Each step in a task is represented by a button in a window. Behind each button is a text field of a color different from the background color of the window and which is also of a color different from that of the button. Additionally, the text field is larger than the button. Initially, the text field is hidden. This indicates that the task indicated on the button is not yet complete. When the user completes a task indicated by the button, the text field behind that button is shown. Since the text field is larger than the button and is in a color different from the background color of the window and from the button itself, when shown, the text field, appears to provide a highlighted border around the button. Thus, the user can determine which steps of a task have been completed by looking to see which step buttons have a highlighted border.

The present invention further provides an improved method, apparatus and article of manufacture for checking the integrity of catalog and directory of databases before a migrate task, for example, is performed on the databases. This is done by performing a series of jobs to verify the integrity of the catalog and directory of databases.

The present invention also provides an improved method, apparatus and article of manufacture for providing information, in the form of a defaults list, to the user of a program regarding parameters whose default values have changed, which parameters are of particular concern to the specific user. During a migrate task, for example, a list of parameters is generated. This list is displayed with only those parameters where the default value has changed from the prior version of the program and where a user of the system selected the default value of the parameter in the prior version of the program. This allows a user of the system to easily view parameters having new default values, where a user had selected the default values of the parameters in a prior version of the program.

BRIEF DESCRIPTION OF THE DRAWINGS

The above objects and advantages of the present invention will become more apparent by describing, in detail, preferred embodiments thereof with reference to the attached drawings in which.

DETAILED DESCRIPTION OF THE INVENTION

A preferred embodiment of the present invention is described below in detail with reference to the accompanying drawings. The present invention will be described in the context of the DB2 database manager or system which assists a user of a workstation operating under an operating system such as Windows NT to load SMPE libraries, install, migrate, fallback, remigrate or update a complex database system on a mainframe computer with an operating system having a nonstandard file structure and lacking an application program interface (API) to a workstation operating system, e.g. an MVS or OS/390 mainframe computer. Windows NT is a trademark of the Microsoft Corporation, DB2 and MVS are registered trademarks of International Business Machines Corporation (IBM) and OS/390 is a trademark of IBM. The procedures are carried out at the workstation under control of the program. While the following discussion is presented in the context of a workstation operating under Windows NT and connected to an MVS or OS/390 mainframe computer with DB2, it is to be understood that the present invention is widely applicable to assisting the user through many interactions with complex programs on different systems.

Figure 1:
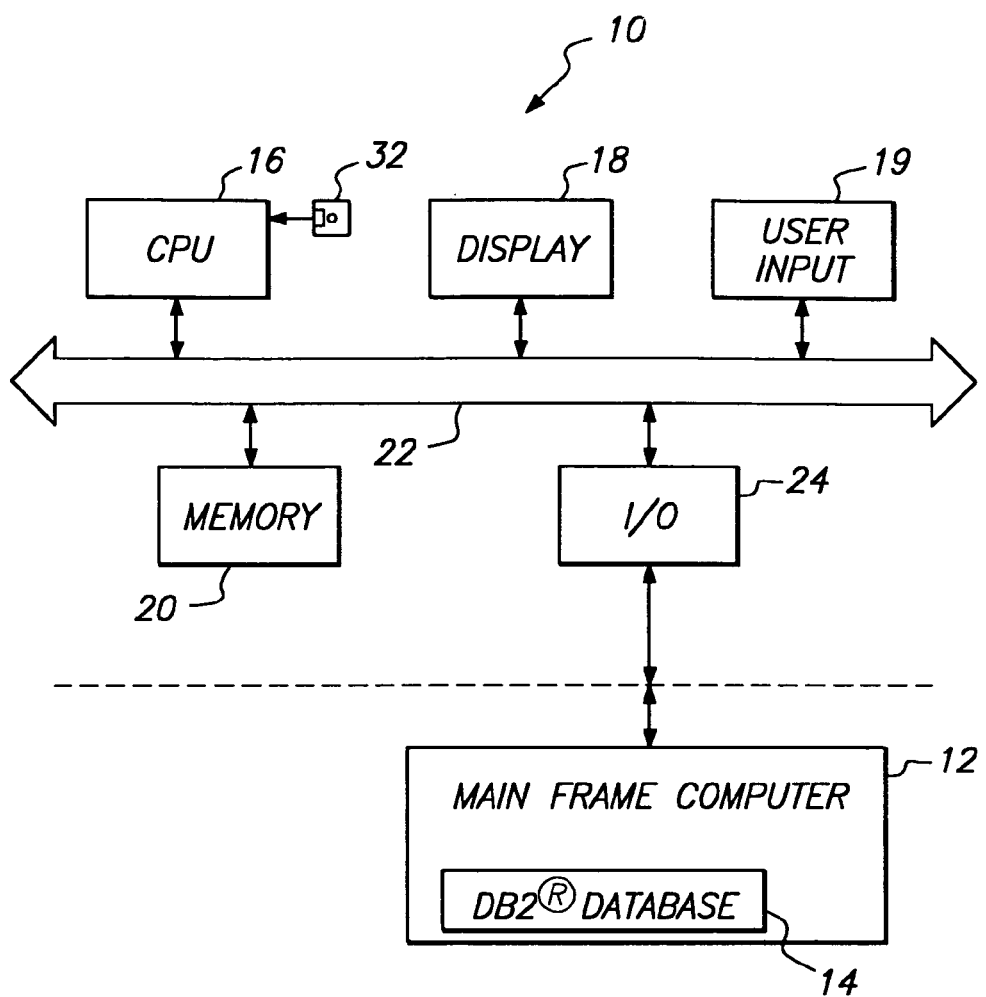
FIG. 1 shows a block diagram of a system that is particularly adapted to perform the method of the invention.

FIG. 1 shows a system to which the program of the present invention may be applied. In FIG. 1, a user computer or workstation 10 is connected to a mainframe computer 12 on which a database system 14 is disposed. Tasks such as load SMPE libraries, install, migrate, fallback, remigrate or update, initiated by a user at user computer 10, may be applied to database system 14. In this instance, it will be assumed that the database system is the DB2 database, a product of IBM, although other database systems are equally applicable. IBM is a registered trademark of the International Business Machines Corporation. Since proper application of any of the load SMPE libraries, install, migrate, fallback, remigrate or update tasks to the DB2 database 14 may require the customization of hundreds of parameters and performance of many interrelated functions, it has been usually carried out by an expert, directly at an interface with computer 12.

The provision of user computer 10 and certain software systems installed thereon provides to the relatively unskilled user, the means to accomplish any of the load SMPE libraries, install, migrate, fallback, remigrate or update tasks. The user computer 10 includes a central processing unit (CPU) 16, a display 18, a user input 19 and a memory 20, all of which are coupled via bus system 22. Communications between computer 10 and mainframe computer 12 are carried out via an input/output module 24.

Figure 2:
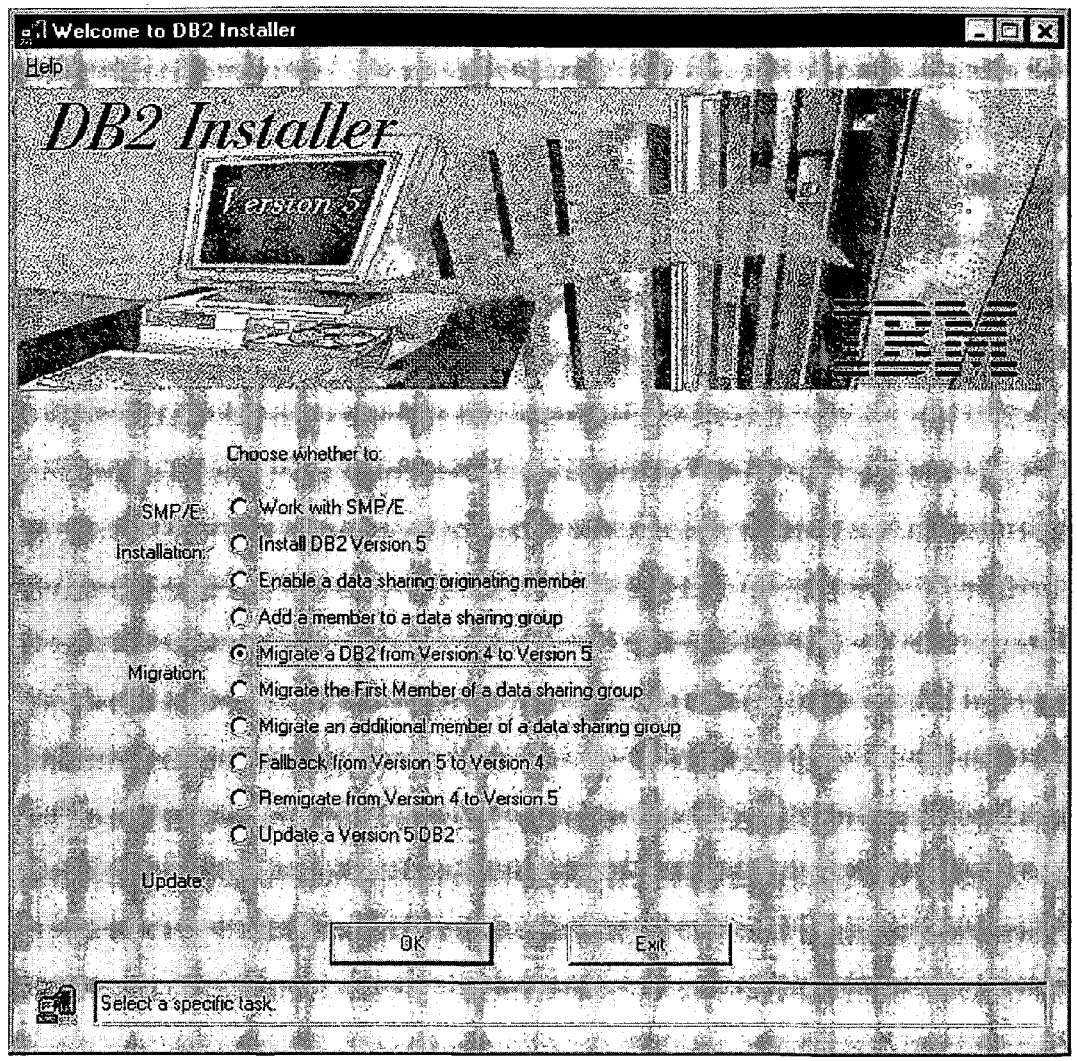
FIG. 2 shows a welcome window, which is initially presented to the user of the workstation, giving the user the option of performing, inter alia, preinstall, install, migrate, fallback, remigrate and update tasks.

In order to accomplish any of the tasks, the program initially presents to the user of workstation 10 on display 18, the welcome window shown in FIG. 2. This welcome window allows the user to select one of the several tasks which may be performed on a DB2, or another database system, including the load SMPE libraries, install, migrate, fallback, remigrate and update tasks. The user indicates his/her selection by providing input via user input 19. Once the user has selected which task to execute, the user is then presented with a window which lists the steps needed to complete a task. This will be discussed in more detail below. The window listing the steps will allow the user to perform such steps as importing values from a previous version of the database system, specifying new function values, modifying his/her options, generating jobs, running jobs and running samples.

The various tasks which may be performed on DB2 will now be discussed in more detail. It shall be understood, however, that tasks will vary from program to program and that the underlying invention will be more generally applicable to the initial setup of complex programs. Over time, there have been different versions of the DB2 database. If a user wishes to go from an old version to a new version, then a task known as migrate is performed. The present invention adds the capability to support this migration function on workstations operating, for example, under Windows NT. Most people who have bought the recently released Version 5 of DB2 already have Version 4. So rather than installing Version 5 of DB2 from a Windows NT workstation, the present invention provides the ability to take Version 4 of DB2 and migrate it to Version 5. The migration results in all the added functionality of Version 5.

The heart of a DB2 database is catalog and directory tables. One difference between the catalog tables of Version 4 and Version 5 of DB2 is that the Version 5 catalog tables have some additional columns. After a successful DB2 migration, the user's application may or may not perform as desired. A user can return to the previous DB2 application without uninstalling the new DB2 version. This is called a fallback. After a fallback task is performed, the new columns of the Version 5 catalog are maintained. The only difference after a fallback is that those new columns are now hidden to a user of Version 4 of the DB2.

Once a fallback is performed and the new Version 5 catalog columns are hidden, the user must then determine the reason for which the original application did not perform as desired. The fallback allows the user of the system to still use the data in the Version 4 DB2 database while the reason for the undesirable application performance is determined.

Once the reason necessitating the fallback is addressed, a remigrate task may be performed. The remigrate is different from the migrate, in that all of the prior work is not lost. Essentially, during a remigrate, the new Version 5 DB2 columns that were hidden by the fallback are shown and functions that were made unavailable at fallback are now supported.

Another task which may be performed upon DB2 is an update. If, for example, the user already has Version 5 DB2 installed and wants to change a parameter, the update task may be used. This task does not result in a change in the version of DB2 used, but simply allows a parameter to be changed.

Regardless of which task is being performed, load SMPE libraries, install, migrate, fallback, remigrate or update, three basic steps are followed. The first step is to set the parameters. DB2 has on the order of 400 different parameters (e.g. set COBOL as the default language). Other database systems also have large numbers of parameters. Each of these parameters may be set using graphical user interfaces (GUIs), which direct the user through the parameter setting process. The parameters may be set by the user using a workstation, which need not be connected to the mainframe host. Once the parameters have been set, the second step is carried out. Namely, jobs are generated. In MVS or OS/390 jargon, jobs refer to a batch of work that needs to be done. Again, the job is generated at the workstation and is saved on the workstation. Optionally, the job may be uploaded to the host system (MVS or OS/390). The third step is to run the job. The workstation, running under Windows NT for example, has a job status window which lists in an icon format all of the jobs that need to be run for a particular task and provides the status regarding each of the jobs. These are the three basic steps which need to be accomplished to complete a task. Sometimes, extra steps may need to be performed and, at other times, not all three of the basic steps need be performed.

Initially, the step of generating and running jobs is discussed in the context of the install task. Utilities and APIs are used to connect the MVS or OS/390 host to a workstation operating under Windows NT, for example. In the example discussed below, MVS is basically a mainframe computer, e.g. the OS/390 product from IBM, and the subsystem is a DB2 subsystem on the mainframe.

DB2 Installer is a workstation based tool which allows a user to perform the task of installing DB2 for MVS or OS/390. In the case of the DB2 Installer, the user begins with an MVS or OS/390 host and must use the install task to put the DB2 subsystem on the MVS or OS/390 host. The user must accomplish this task using jobs. During the install, the user of the workstation is asked, through a GUI, for the values desired for the parameters for the DB2 subsystem. Once this is done, jobs on the workstation are generated and saved on the workstation.

A connection between the workstation and the host is then established using, for example, a TCP/IP connection, although other types of connections are possible. The TCP/IP connection is used to send the jobs that were generated on the workstation to the host. The jobs are logged on a queue file called JES Queue. On MVS or OS/390, there is a normal file structure, which works just like it would in DOS or in any other operating system. The JES Queue is a little different in that it is a repository to which jobs are sent to be run on the host. It is the jobs which actually perform the work of installing the DB2 subsystem. After the jobs are run, return codes are generated and sent back to the workstation. These are used to inform the user at the workstation whether the job ran successfully or not. Feedback to the user as to the status of the job is easy to provide for a workstation operating under the OS/2 operating system, because OS/2 readily allows for access of status information from the JES Queue. OS/2 is a registered trademark of IBM. In OS/2, there is an API which allows communication with the JES Queue using file transfer protocol (FTP). This API is needed to communicate with the JES Queue because the JES Queue is a repository which does not have a normal file structure.

This procedure allows the user of a workstation operating under OS/2 installing DB2, for example, a way to submit jobs and get feedback by getting the output of the job from the JES Queue. However, this procedure is not directly available for a user of a workstation operating under Windows NT. This is so because jobs to be run on the mainframe must first be sent to the JES Queue to be logged. Additionally, access to the JES Queue is needed to provide sufficient knowledge to determine the status of the jobs. However, Windows NT cannot communicate with the non-standard file structure of the JES Queue. Windows NT lacks the API of OS/2 which uses FTP to communicate with the JES Queue. Because the JES Queue lacks the standard file structure, as discussed above, and because Windows NT lacks the API of OS/2, Windows NT cannot communicate directly with the JES Queue.

The present invention provides a solution for this problem. In accordance with the present invention, for a workstation operating under Windows NT, for example, instead of directly using an FTP API, a standard command prompt in Windows NT is used to submit a series of MVS commands in the form of a single file to the host. This is accomplished by using the command prompt to submit templates of FTP commands which are edited and then sent to the host along with the job to tell the host what to do. The FTP command templates include a template for GET (to retrieve files), a template for PUT (to place or send files) and a template for DIR (to obtain directory listings).

Discussing this process in more detail, from the user's perspective this entire process will be completely transparent. The user simply uses a GUI to assign a name to a job and indicate that he/she wishes to run the job. At this point the TCP/IP connection to the host has already been set up. Then, transparent to the user, the template for the FTP PUT command is accessed and filled in with the correct commands and job name. The template is then executed, which causes the job to be put on the JES Queue and the JES Queue then handles running it. When the job is done, the JES Queue has a specific output file that it puts out. In order to determine when the job is done, the JES Queue is polled using a series of FTP templates for DIR. Essentially, this performs a directory check on the JES Queue each time the FTP DIR command template is executed. Based upon the file name of the job, the name of the output file on the JES Queue is known. The polls are continued, DIR after DIR after DIR, until the specific output file appears on the JES Queue. Then the FTP GET template is used to grab the output file and bring it down to the workstation. The user of the workstation is then given an indication that the job is complete. Thus, the present invention provides the capability of apprising the user of a workstation, operating under Windows NT, for example, of the status of jobs being run on the host.

Turning now to the step of setting parameters, as noted above, the user of a workstation operating under Windows NT, for example, is initially presented with the welcome window shown in FIG. 2. This window presents to the user the different tasks which may be executed. The window lists, inter alia, the preinstall, migrate, install, fallback, remigrate and update tasks, which may be selected by the user. In FIG. 2, it can be seen that the task "Migrate a DB2 from Version 4 to Version 5" has been selected. For ease of understanding, the remainder of our discussion will focus on this selected migration task. However, it should be kept in mind that a corresponding discussion applies to the other tasks of load SMPE libraries, install, fallback, remigrate and update as well as to other similar functions. Once again, while the following discussion takes place in the context of DB2, the general principles are widely applicable to other database systems.

Figure 3:
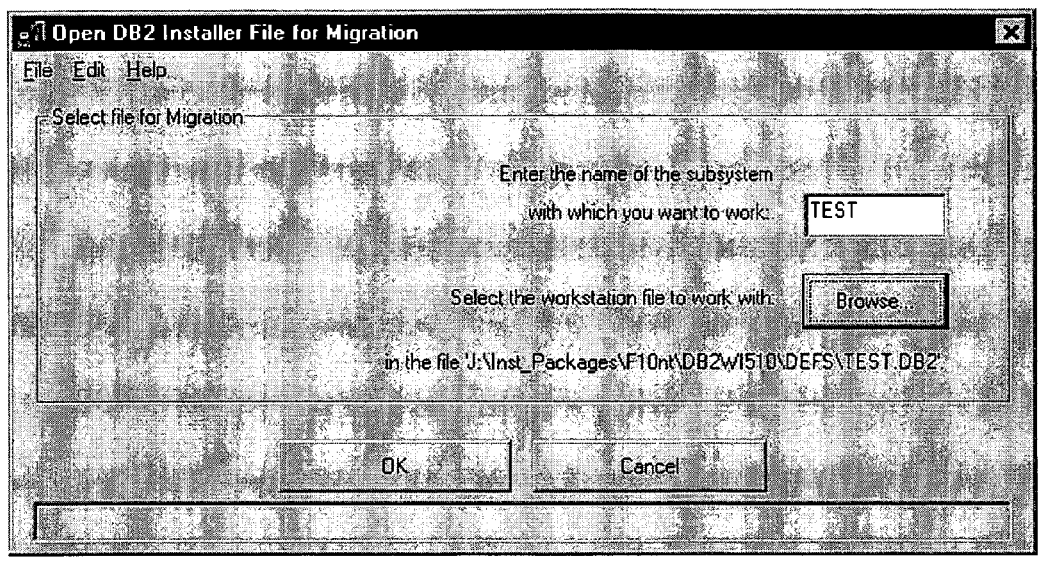
FIG. 3 shows a window which directs a user in opening a DB2 Installer file for migration.
Figure 4:
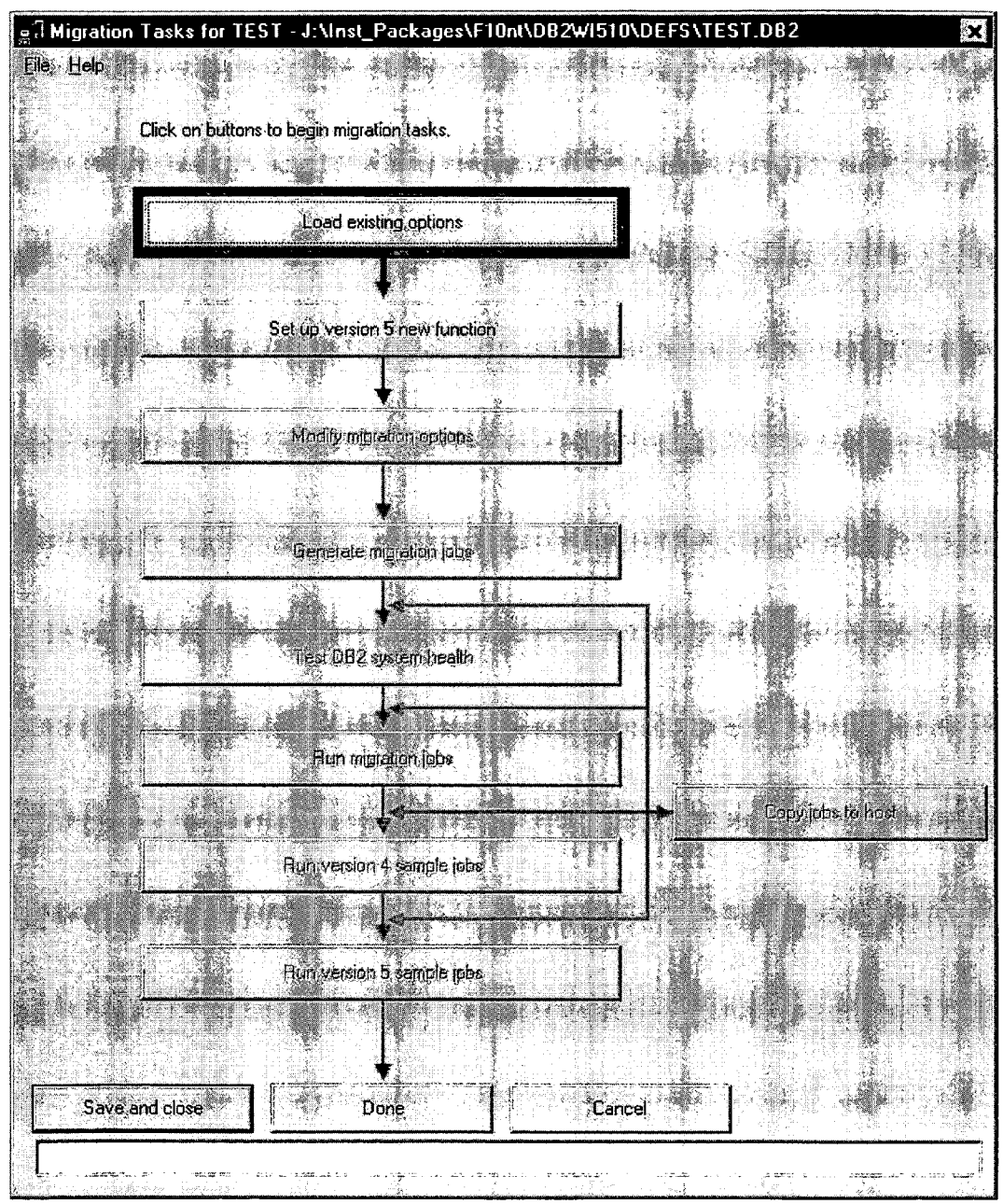
FIG. 4 shows a window which lists the steps to be completed by a user for a migration task.

Once the user has selected the "Migrate a DB2 from Version 4 to Version 5" task option and has clicked on the "OK" button, the user is then presented with the window shown in FIG. 3. This window directs the user in opening a DB2 Installer file for migration and gives the user the option of filling in a field to indicate the name of the DB2 subsystem to be put on the host. Alternatively, the user can click on a browse button to browse for a subsystem name. If the user fills out a subsystem name, that name plus the extension ".DB2" will be used as the default name in the ensuing file dialog. If the user clicks on the browse button without first filling out the subsystem name, the default filename will be "*.DB2". In either case, if it is determined that the user has selected an already existing subsystem name, that indicates that the named subsystem file must be already in the process of being migrated. If the user is beginning a new migration, a unique subsystem name must be selected. After the user fills in or selects the name of the subsystem, the OK button is enabled. When the user clicks on the OK button, the user is presented with the window shown in FIG. 4. FIG. 4 provides to the user a list of steps which are to be taken to complete a task, in the present case, migrate. Similar windows are presented to users, listing the steps for executing the load SMPE libraries, install, fallback, remigrate and upgrade tasks.

Figure 5:
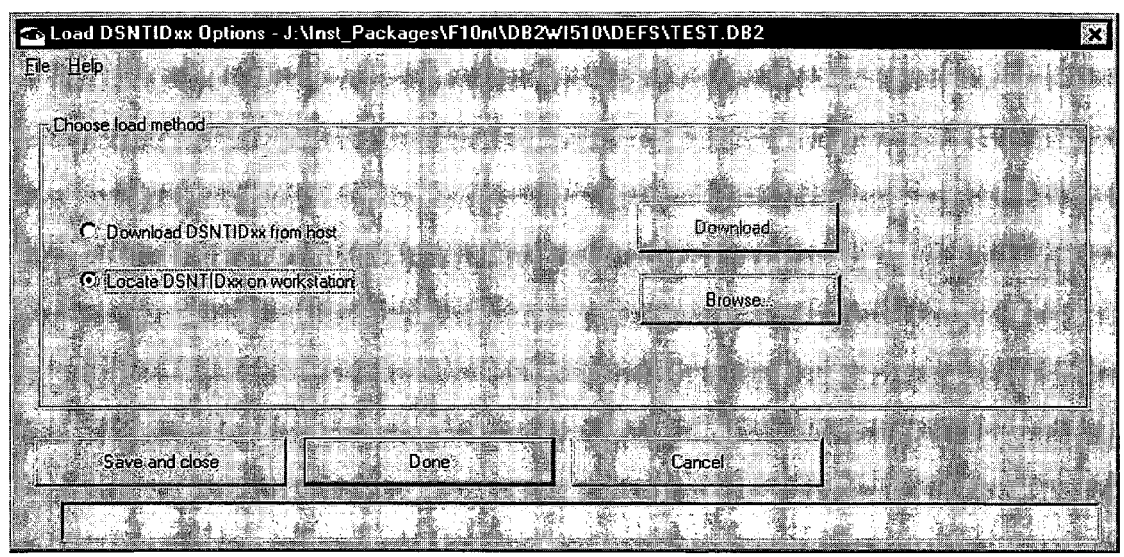
FIG. 5 shows the window which allows a user to load a DSNTIDxx file from either a workstation or a host.

The first step to be completed by the user for the migrate task is to "Load existing options." Existing options are parameters that were set in the previously installed version of the program, in this case, DB2 Version 4. In a preferred embodiment, the previously set parameters are saved in a file created during the prior installation. Once the user selects this button, shown in FIG. 4, the user is presented with the window shown in FIG. 5. Existing options and parameters, as they were set in Version 4 of DB2, can be found in a file called, for example, DSNTIDxx, which was the output of the install process for Version 4. A user can use a filename other than DSNTIDxx, or can use multiple files. This file may either be stored on the workstation or on the host. FIG. 5 shows the window which allows the user to load the DSNTIDxx file using one of two options. First, the user can use FTP to download the file from the host by selecting the "Download DSNTIDxx from host" button or second, the user can load the file from the workstation by selecting the "Locate DSNTIDxx on workstation" button.

Figure 6:
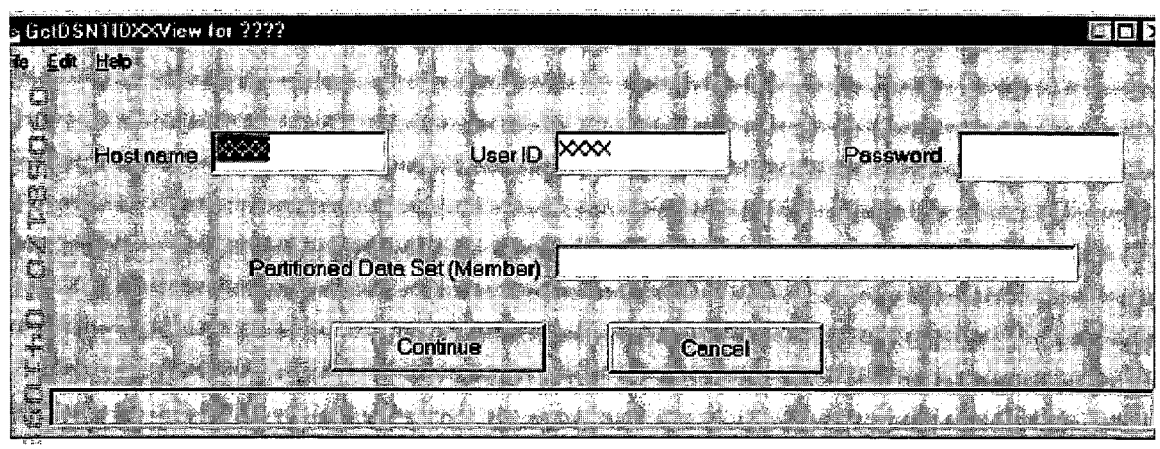
FIG. 6 shows a window where the user provides information needed to download the DSNTIDxx file from the host.

If the user selects the first option, to download the file from the host, the user must provide information that will allow the installer to locate the file on the host. For example, in the described environment, this information may include the host name, the user ID and the password using the window shown in FIG. 6. Additionally, the user may provide the partitioned data set member, which is the MVS filename. With this information, FTP is used to locate and download the file, in this case, an MVS file. The file, as downloaded, is in a different format from that which is to be used in the workstation. So, the file, whatever its format, must be parsed to extract all of the options and parameters set up for the previous program version out of the file. Once this is done, the user is provided with information regarding whether or not the file was downloaded and parsed successfully and if it was not successful, the user is provided with reasons.

If the user selects the second option, to load the file from the workstation, the user can use the Browse button, shown in FIG. 5, to select the appropriate file for parsing. Under either option, the user may decide to click on the "Save and close button" shown in FIG. 5. The user may select this button when he/she has not yet completed this step, but wishes to return to it at a later time. If the user chooses to complete this step, after the DSNTIDxx file has been successfully parsed, the user clicks on the DONE button, shown in FIG. 5 and is returned to the window shown in FIG. 4. FIG. 4 indicates that the user has already completed the first step of the migrate task, "Load existing options," as just discussed, by the fact that the button labeled "Load existing options" is highlighted.

It is important to be able to show to the user exactly what steps have been completed. For example, the user could begin the "Load existing options" step shown in FIG. 4. This is an extended process and so it could very well be that the user initiates the step, gets part way through the process and decides that he/she wants to save the work he/she has completed thus far and leave. The user might do this by clicking on the "Save and close" button, as discussed above. The user would then come back to the saved place at a later time, and the button for the load existing options step, while enabled, would not be highlighted, since the user left the task uncompleted. Thus, it is important to make it clear to the user that just because a button representing a step is enabled does not mean that the step is completed. A separate indication must be provided to the user so that he/she knows that a particular step has been completed.

For users of workstations operating under OS/2, providing an indication that a step of a task had been completed is a simple matter. This is so because OS/2 allows the color of a button to be changed. Thus, for a user working on a workstation operating under OS/2, once a user had completed a step, the color of the button representing that step can be changed to another color, for example, green.

However, this will not work for users of workstations operating under Windows NT, for example. This is so because Windows NT does not allow the color of a button to be changed, as can be done in OS/2. Thus, a new way had to be developed to show the designation of a completed step to the user. The present invention provides the solution. In the present invention, text fields have been placed behind each of the buttons (e.g. the "Load existing options" button, shown in FIG. 4) on the screen representing steps which must be completed for a task. The text fields are in a color that is different from the background color of the window and are also in a color different from that of the buttons. For example, the color of the text fields may be made green, although other colors could be used to indicate a completed task. Additionally, the text fields are larger than the buttons, so that when the buttons are placed on top of the text fields, the text fields show up as a border around the buttons. Taking a single button, initially, the text field behind the button is hidden so the user only sees the button representing a step that must be completed by the user. Only when the user indicates that a particular step is completed, for example, by clicking on a "Done" button or viewing the last window in a series of windows relating to the step, is the text field shown, thereby providing a colored border around the button representing the completed step. If the user were to leave a particular task uncompleted and perform a save and close operation, intending to complete the step at a later time, the text field would not be shown. This process is repeated for each of the steps for a particular task and enables the user to easily see which steps have been completed.

Figure 7:
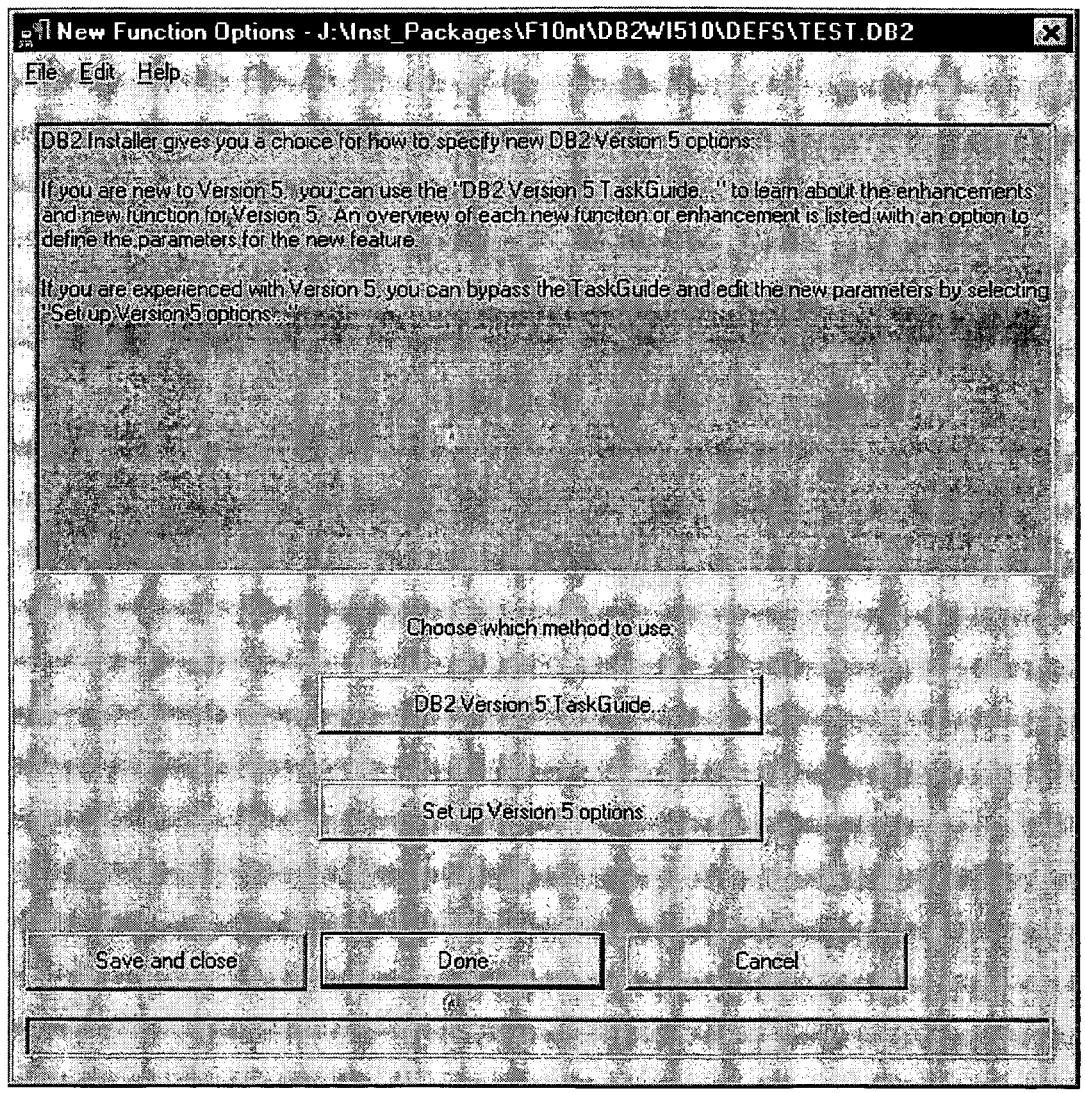
FIG. 7 shows a window which allows the user to select between a TaskGuide route and an expert route to set up DB2 parameters.

Looking again at FIG. 4, once the "Load existing options" step has been completed, the user can then move on to the "Set up version 5 new function" step. After the user clicks on the button labeled "Set up version 5 new function," the user is taken to the window shown in FIG. 7. At this point, the user has now accessed the Version 4 options and parameters. However there are new functions and new parameters associated with Version 5. This is often the case when new versions of database systems are created. To assist the user in navigating through these new functions and parameters, the present invention provides the users with a TaskGuide to tell users about the new functions and parameters.

Of the new functions and parameters, some need not be set by the user, some may be =set by the user and some must be set by the user. A problem arises due to the fact that during a migrate, etc. there are on the order of 100 different predefined install windows in which these different functions and parameters can be set. Intelligence is built in to all these different windows allowing the system to check for certain file types and different types of input. For example, if the user inputs something in one window, that user action may indicate another window must be presented to the user. The present invention maintains all of this intelligence associated with the predefined install windows.

Returning to FIG. 7, it can be seen that the user has two paths to follow to set the functions and parameters. First, the user can select "DB2 Version 5 TaskGuide," to access information regarding the functions and parameters. Second, the more expert user can select "Set up Version 5 options."

Figure 8:
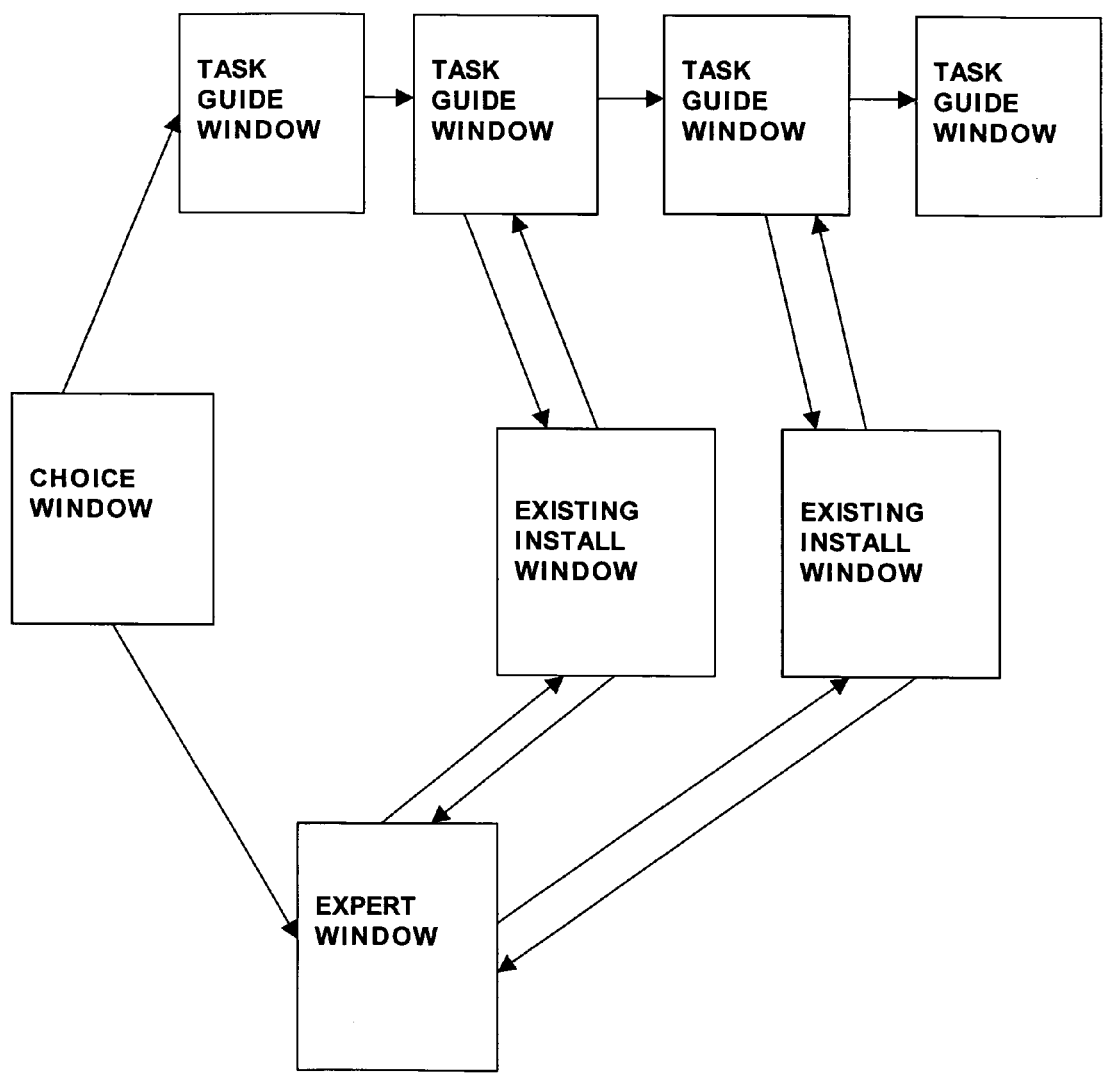
FIG. 8 shows the logical connection between the user's options of selecting either the TaskGuide route or the expert route.

FIG. 8 logically shows the choice to be made by the user, in the context of DB2 Version 5, where the user selects one of the two options discussed above. From the box labeled "Choice window," the user either selects the TaskGuide, made of TaskGuide windows, or the Expert window. The Expert window and some of the TaskGuide windows may be linked to the predefined install windows with the intelligence built in.

Figure 9:
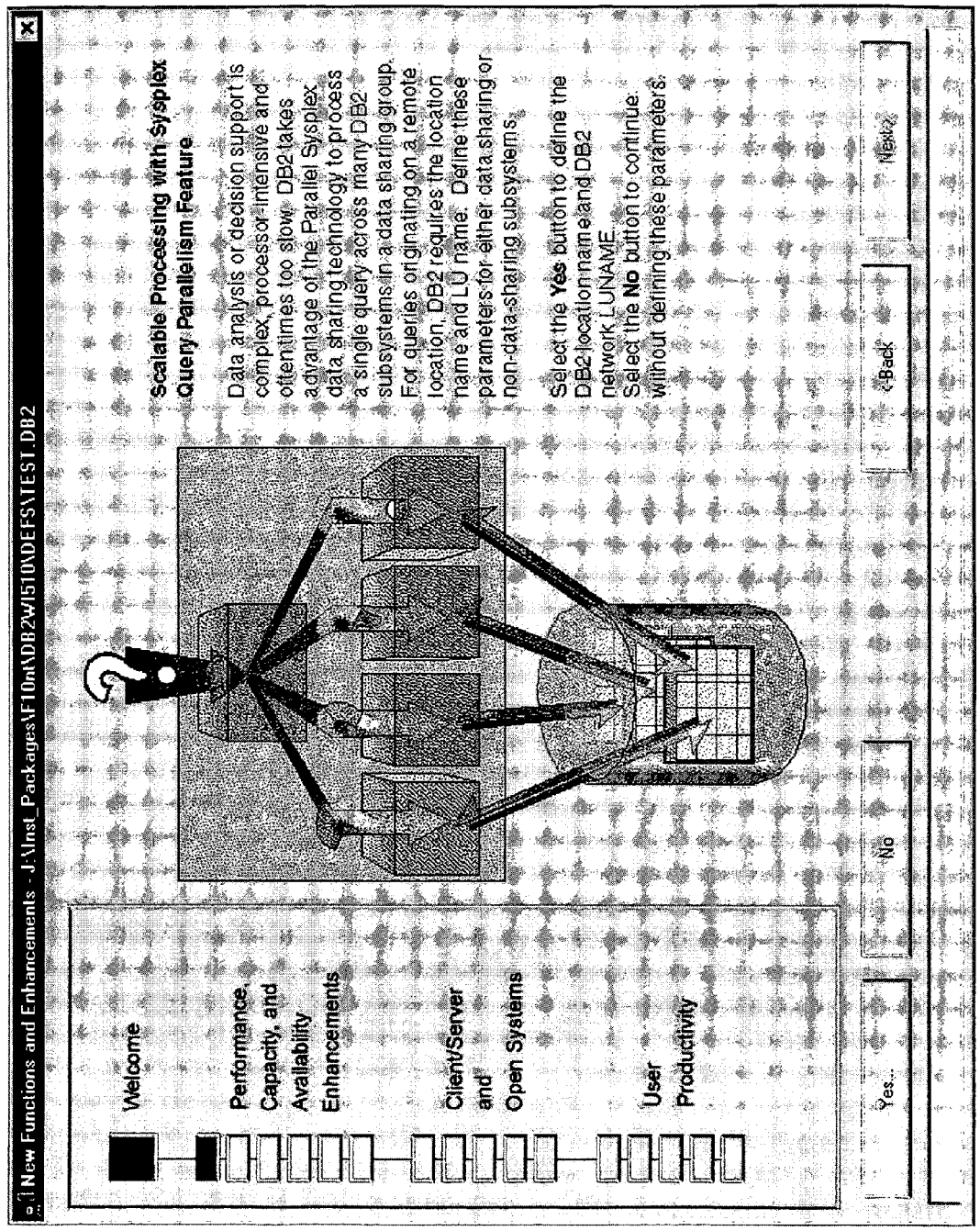
FIG. 9 shows the TaskGuide window entitled "Sysplex Query Parallelism."

First, the TaskGuide user option is discussed. Each TaskGuide window provides an explanation of a single associated function or parameter. FIG. 9 shows the second of the TaskGuide windows, where the first window is just a welcome window. On the left side of this figure there is a navigation bar relating to a single task. The navigation bar tells the user that the new functions and parameters are separated into three separate groups: performance, capacity and availability enhancements; client/server and open systems; and user productivity. Each of these groups has several of the new functions and parameters assigned to it. The navigation bar also has a rectangular icon associated with each of these new functions and parameters. When the user has viewed a TaskGuide window associated with a particular new function or parameter, the associated icon on the navigation bar is changed in color, turned green, for example. This allows the user to determine where in the TaskGuide he/she is at present time and where he/she has been. Returning to the right-hand side of FIG. 9, it can be seen that this TaskGuide window is associated with a particular function or parameter called "Sysplex query parallelism."

Figure 10:
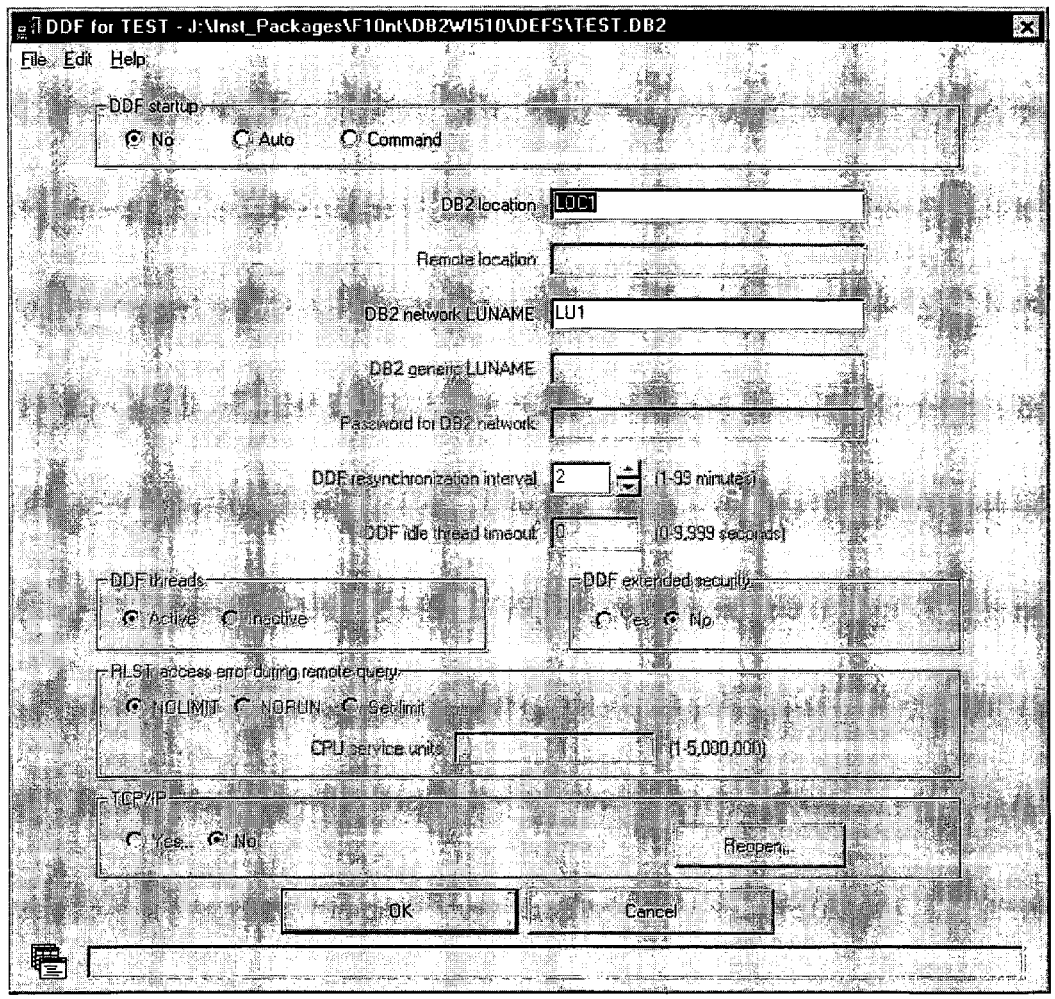
FIG. 10 shows the predefined install window presented to the user when the user indicates a desire to change parameters relating to "Sysplex Query Parallelism."

In FIG. 9, the user may select the Yes button to set the parameter, or may select the No button if the user does not wish to set the parameter. If the user selects the No button, the Next button is enabled so that the user may continue. If user selects the Yes button, the user is then presented with the window shown in FIG. 10, labeled as a DDF window, with fields to be filled out by the user. FIG. 10 is an example of an predefined installation window, which is linked to the TaskGuide window, as shown in FIG. 8. The predefined installation window, which exists in DB2, has intelligence built into it. Such predefined installation windows may exist in other database programs. The user is taken to this predefined installation window to set the parameter associated with the TaskGuide window. This linking of TaskGuide windows and predefined installation windows allows the user to view whatever information is in the predefined windows and receive help for that window, if desired. Once the user selects the "OK" button on the predefined install window, the user is returned to the TaskGuide window he/she was previously viewing, in this case, FIG. 9. The "Next" button will then be enabled, allowing the user to select that button and continue on in the TaskGuide.

In the preferred embodiment of the present invention, in order to keep the process of setting parameters manageable, the user is forced to go to the predefined install window to change the parameters. Alternatively, the user could change the parameters directly in the TaskGuide. In this case, the system would have to also change the parameters in the predefined install windows. Thus, error checking would have to be implemented, which executes in two different locations: in the TaskGuide itself and in the predefined install windows.

Going back to FIG. 8, and the preferred implementation, the series of predefined install windows, which are task type windows, can be seen. It should be noted that some of the TaskGuide windows do not have arrows pointing to an predefined install window. This is because in these cases there is nothing for the user to input. Additionally, the arrows from the TaskGuide windows go straight to the predefined install window and back. This makes clear that the predefined install windows are not implanted in the middle of the flow of the TaskGuide windows. Rather, there are links off of the TaskGuide windows to the predefined install windows and links back to the particular TaskGuide window in the TaskGuide from which the link came off.

Figure 11:
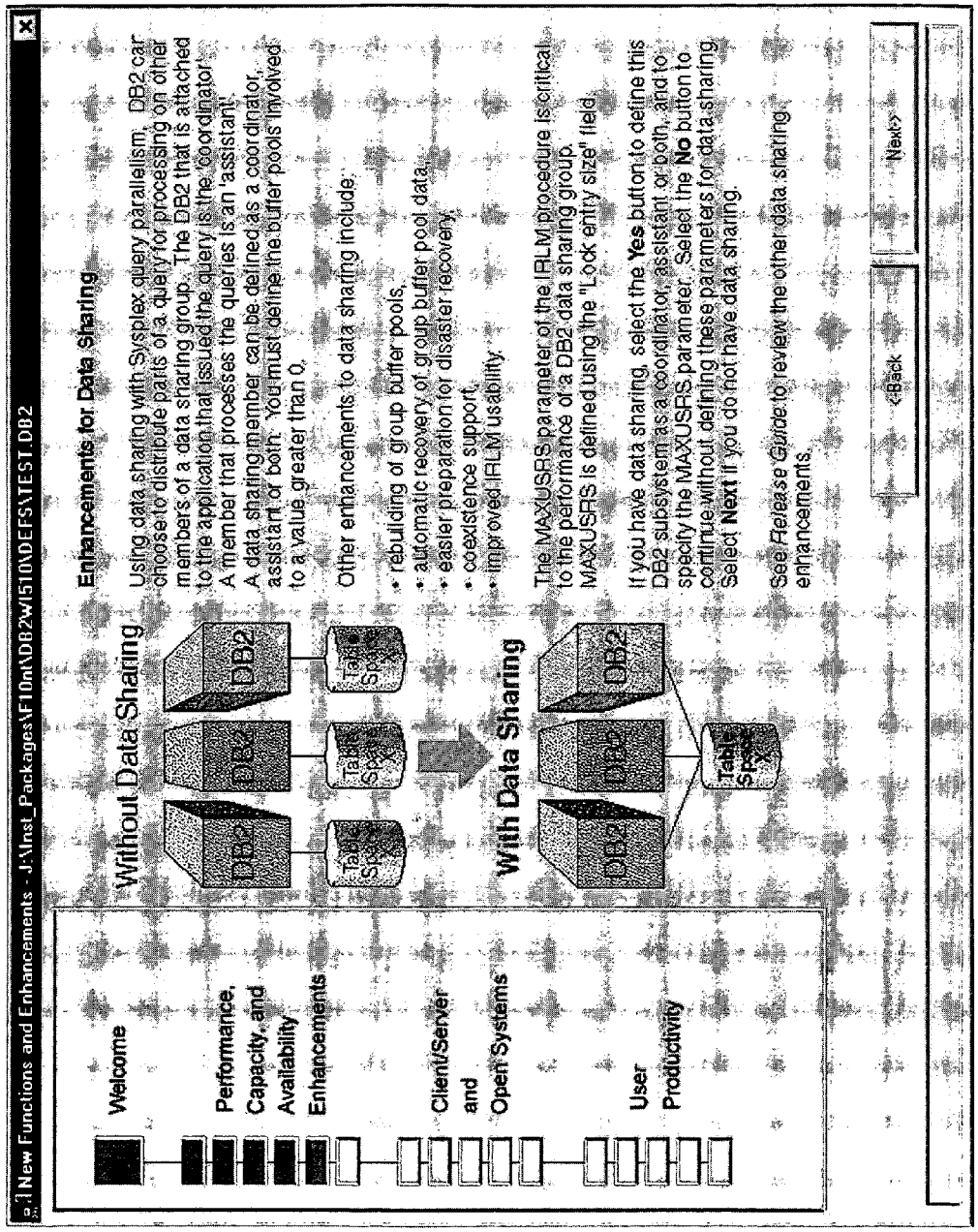
FIG. 11 shows another TaskGuide window entitled "Enhancements for Data Sharing."

Turning to FIG. 11, which shows the "Enhancements for Data Sharing" TaskGuide window, this is an example of a TaskGuide window which does not have "Yes" and "No" buttons. In this case, a check was performed to determine if the user has data sharing and it was discovered that the user did not have this feature. Thus, there is no reason for the user to set the options relating to this feature. In this case, the TaskGuide window is used to tell the user that there are enhancements for data sharing, in the event that the user wishes to take advantage of those enhancements in the future.

Figure 12:
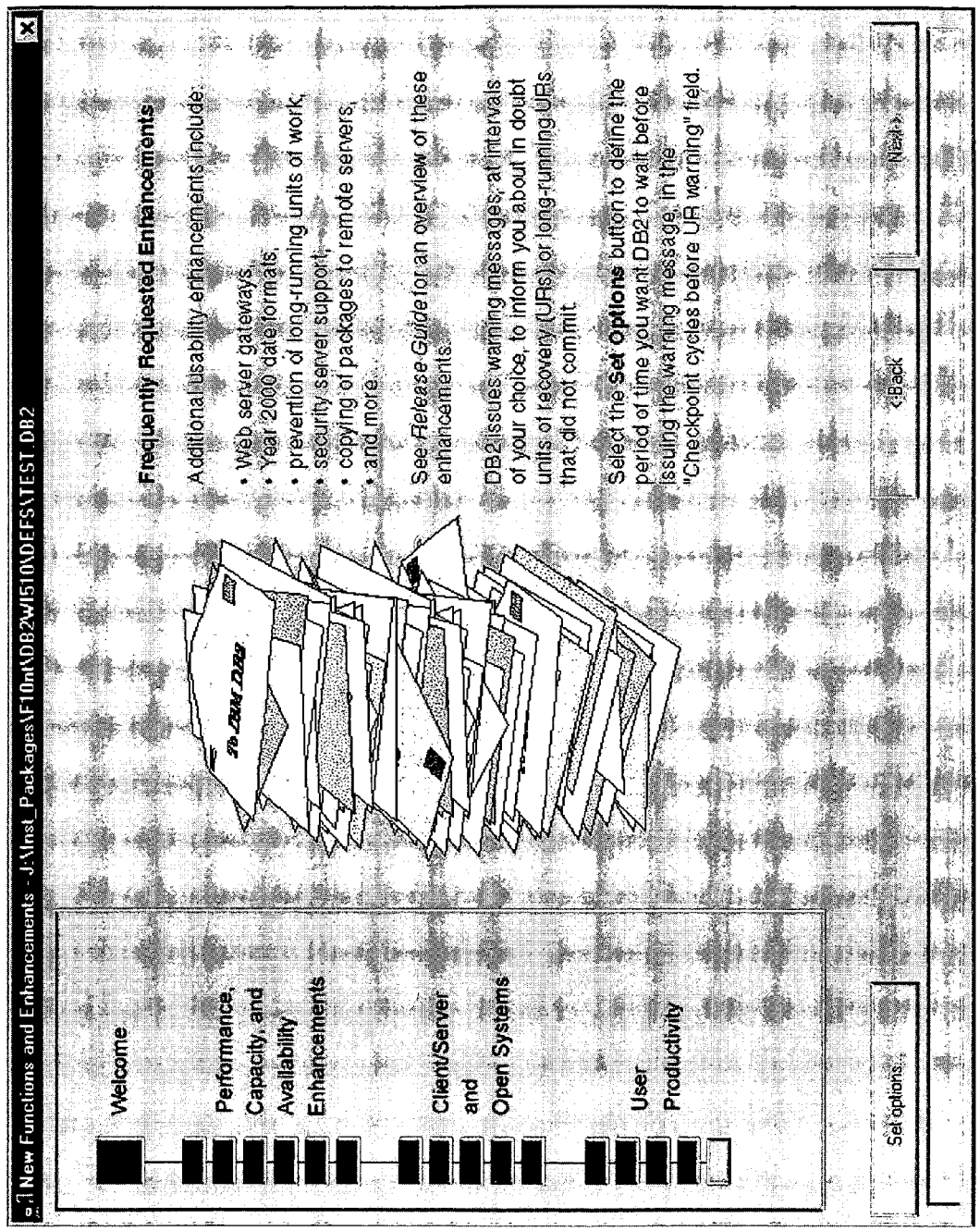
FIG. 12 shows another TaskGuide window entitled "Frequently Requested Enhancements."
Figure 13:
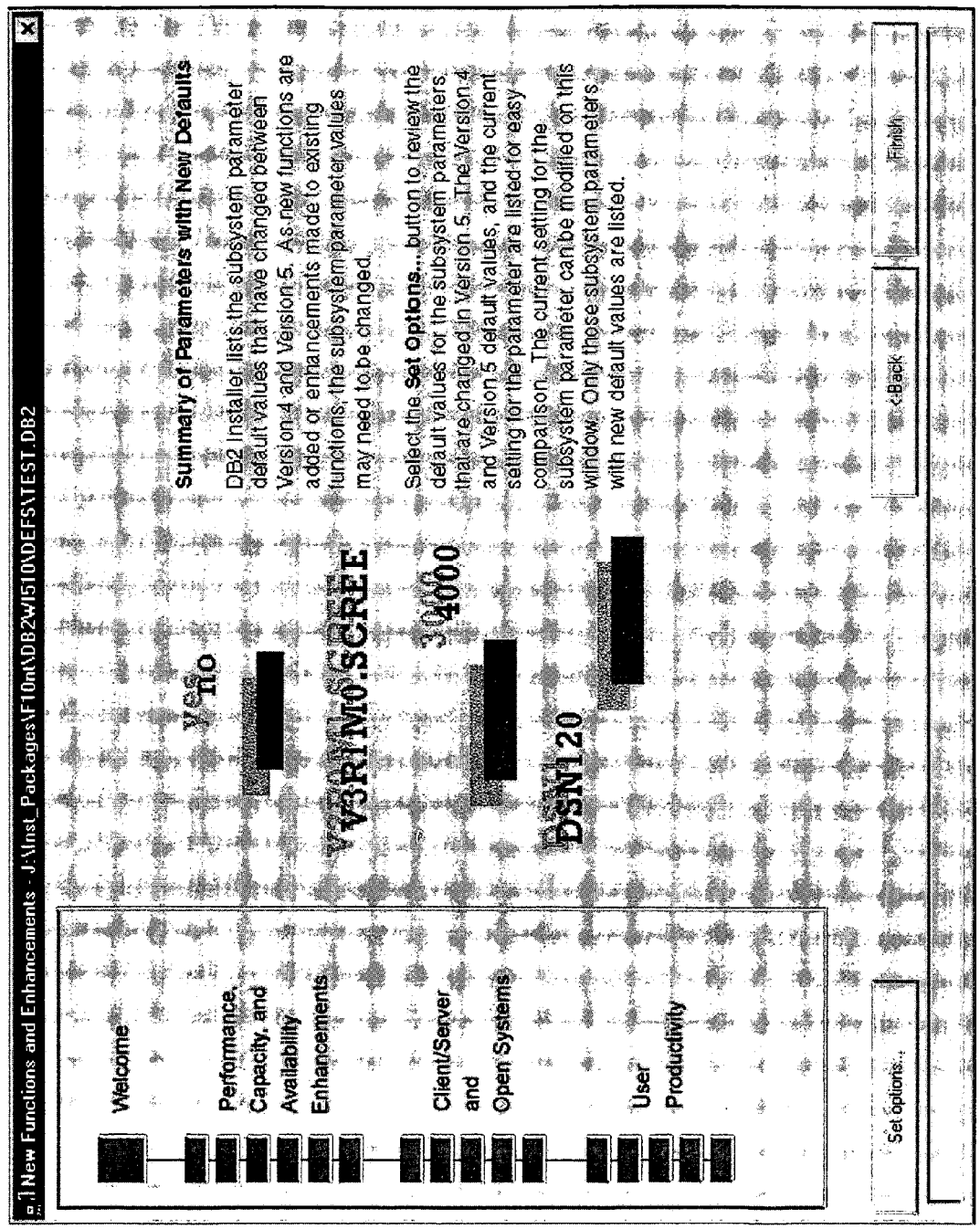
FIG. 13 shows another TaskGuide window entitled "Summary of Parameters with New Defaults."

Turning to FIG. 12, we see a TaskGuide window entitled "Frequently Requested Enhancements." Turning to the right side of FIG. 12, we see that instead of the "Yes" and "No" buttons, the user is presented with a "Set options" button. The user is presented with this button if the user must fill in these parameters. Preferably, the user is not given a choice, but must go to the associated predefined install window, where the user highlights and sets the fields in question and is then returned to the "Frequently Requested Enhancements" TaskGuide window. FIG. 13 similarly requires the user to select the "Set options" button.

Figure 14:
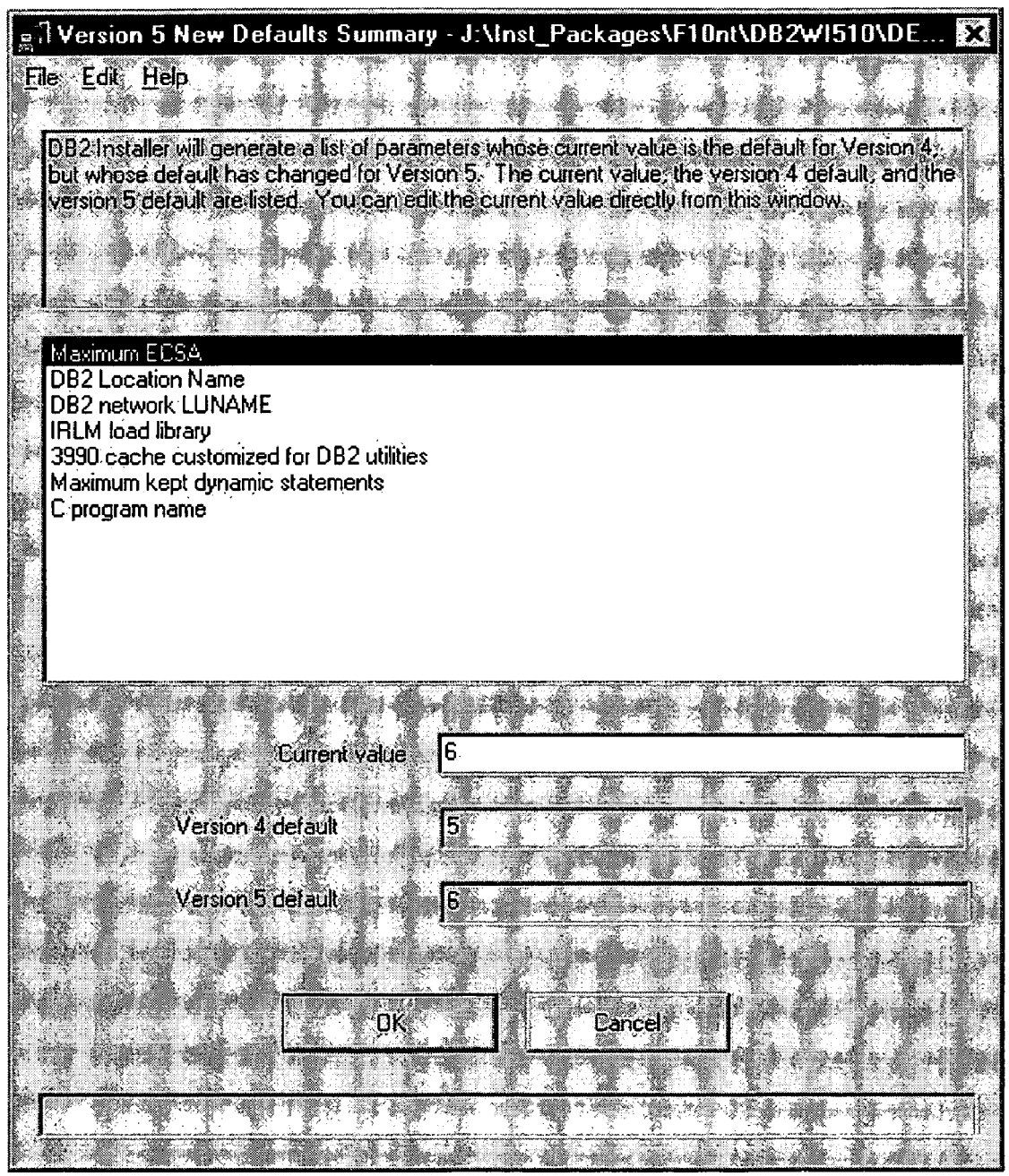
FIG. 14 shows another TaskGuide window entitled "Version 5 New Defaults Summary."

Turning now to FIG. 14, displaying a window labeled "Version 5 New Defaults Summary," this shows the new defaults window. This particular TaskGuide window is another example where, preferably, the user has no choice but to follow through with some sort of action. However, this is one case where the user is not sent to a predefined install window. Rather, the user is sent to something called the new defaults summary. In DB2, every parameter has a default value. It is very common for a given user to keep the default value for particular parameters. For various reasons, when a new version of DB2 comes out, the default values might change. So, the complete list of DB2 parameters is examined to determine all the parameters whose default values have changed in the new version of DB2. Then, those parameters, whose default values have changed, are examined to determine those of the parameters where, in Version 4 of DB2, the user accepted the default value of the parameters.

If the user did not select the default value in Version 4, he/she is not likely to be interested in what the default value is in Version 5. The user apparently had a reason to change from the default value and as a consequence must know about the parameter. There is no need to worry about the user in such a situation. If, however, the user had accepted the default value of a parameter in Version 4, it is desirable to inform the user that the default has changed by listing the parameters in the new defaults summary, and give the user an opportunity to change the default value.

Figure 15:
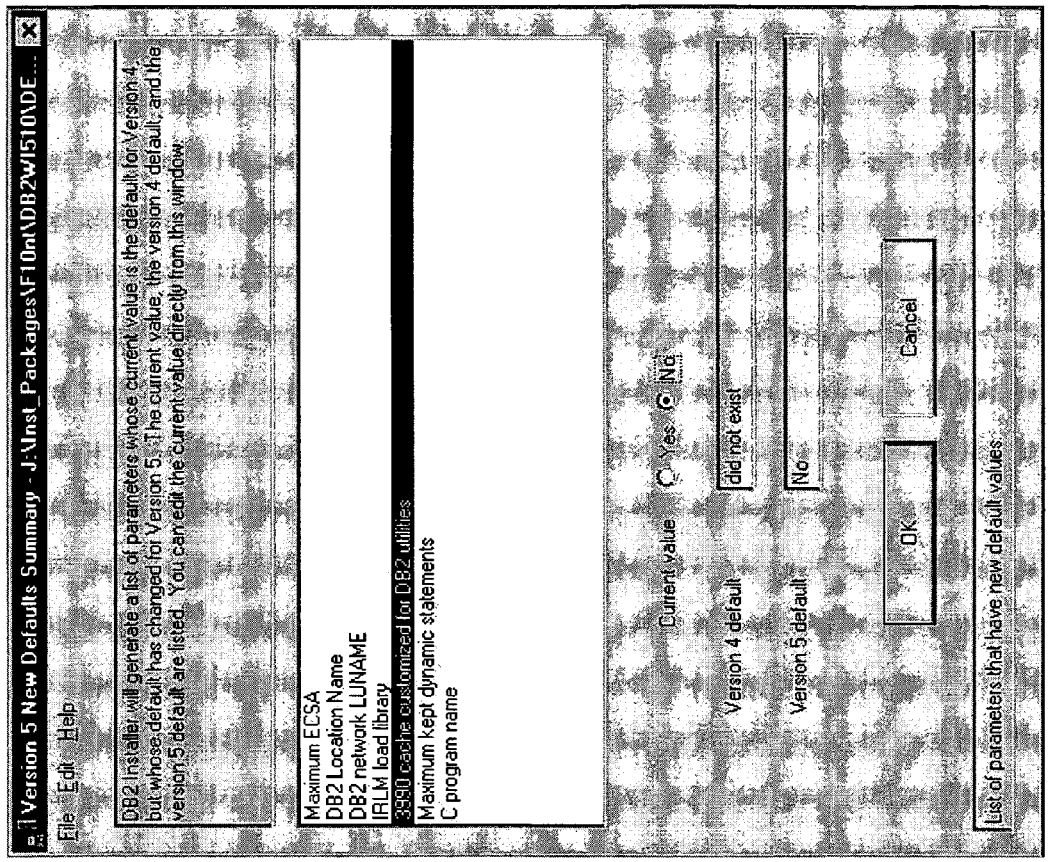
FIG. 15 shows another version of the TaskGuide window entitled "Version 5 New Defaults Summary."

The new defaults summary TaskGuide window shown in FIG. 14, another example of which is shown in FIG. 15, provides to the user a list of all the parameters whose default values have changed, where the user had accepted the default values in Version 4. For each of these parameters, this window also provides to the user information regarding the Version 4 default value, the Version 5 default value and the current value. The user may change the value of the parameter from the default value by changing the current value field in the window.

Figure 16:
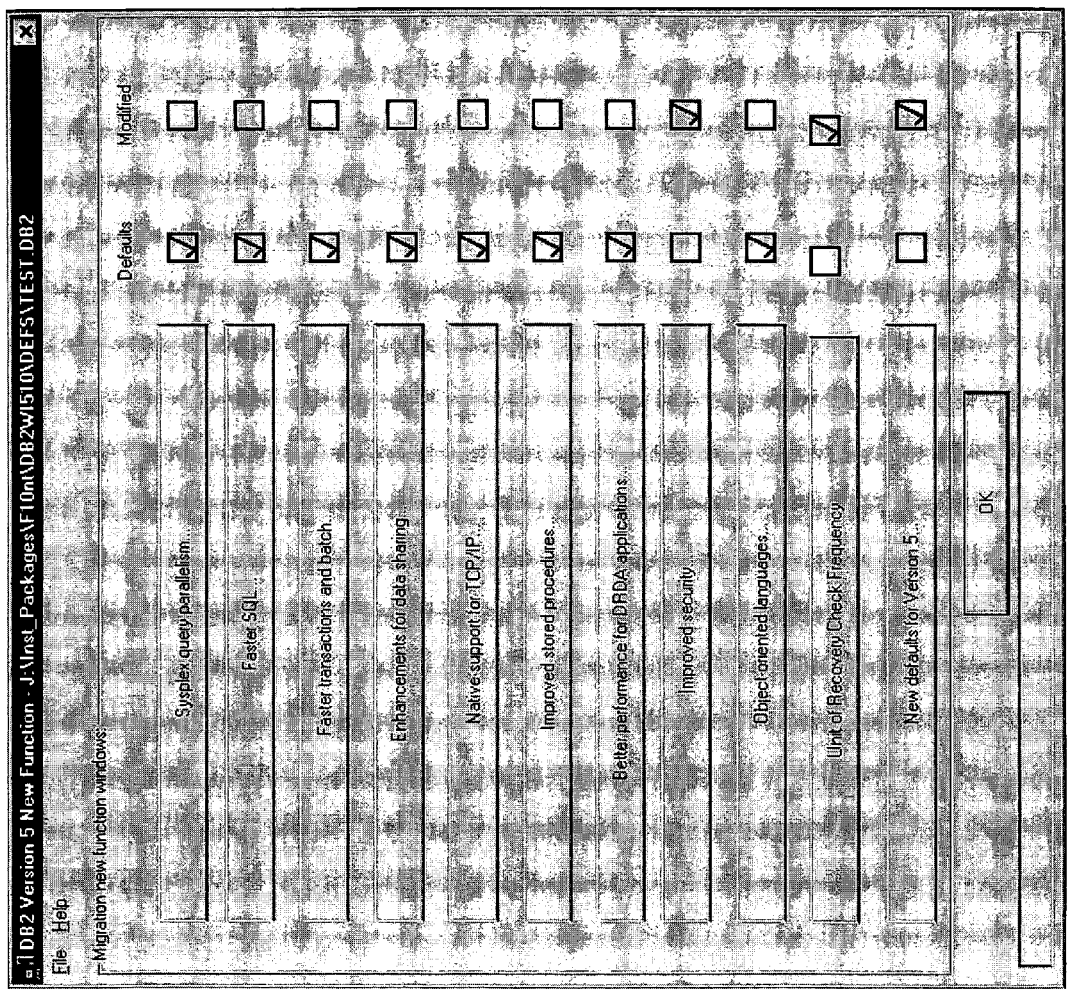
FIG. 16 shows a window presented to the user when the expert route is selected.

Returning once again to FIG. 8, which shows the "Choice window," the expert path will now be discussed. This path is taken by a user who is familiar with all of the new functions and parameters of the new version of DB2 and need not be stepped through the TaskGuide to learn of the new functions and parameters. When this path is selected, the user is presented with the Expert window, which is shown in FIG. 16. This expert window presents the user with a list of buttons representing all the predefined install windows that the user would have eventually accessed had he/she gone through the TaskGuide.

Figure 17:
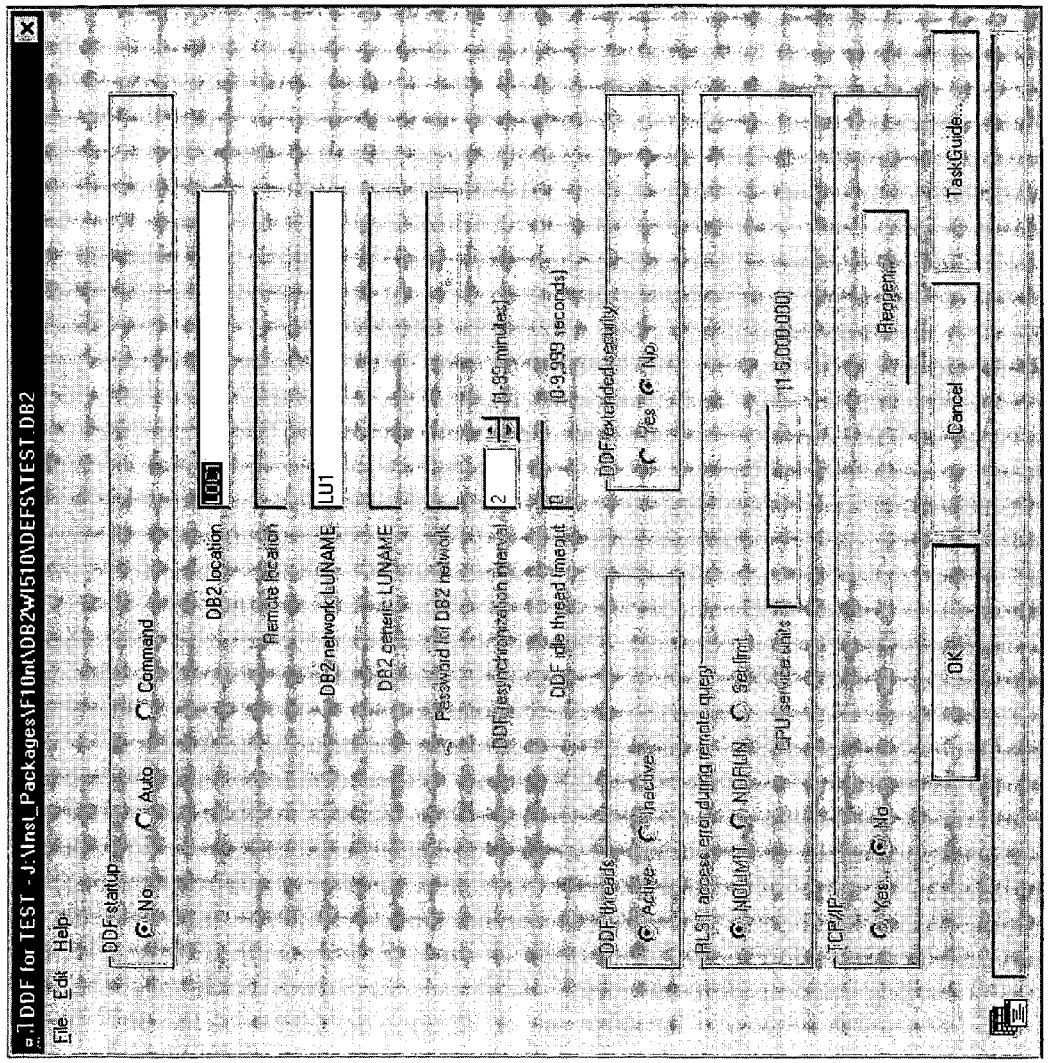
FIG. 17 shows an predefined install window presented to the user when the user indicates a desire to change the parameters shown.

For example, if the user were to select the button marked "Sysplex query parallelism", he/she would be presented with the window shown in FIG. 17, the same window as shown in FIG. 10, where both Figures show the fields to be filled out by the user. The difference in FIG. 17 is that there is also a button labeled TaskGuide, which was not visible in FIG. 10. This TaskGuide button allows the expert user to access the TaskGuide in case the information available there is needed.

In summary, the user has the option of choosing one of two paths, the TaskGuide path or the expert path. If the user chooses to go through the TaskGuide, he/she is given information about all the new functions and parameters. If the function or parameter is changeable, the user is given the opportunity to leave the Task Guide, go to an predefined install window, set parameters, return to the Task Guide and continue. If the user chooses to go to the expert path, the user is given a list of all the predefined install windows that may be accessed. The user can then jump to every one of those predefined install windows that he would have been able to access by using the TaskGuide, including the new defaults window.

In the present invention, the TaskGuide gives the user information about all the new functions and parameters, while utilizing all the separate predefined install windows. The same can be said for the expert path, where the user can leave the Expert window and jump to any of the predefined install windows. This provides the user with the ability to find out about all the functions of the product, without having all of the parameters in two different places, in the TaskGuide windows of the TaskGuide and in the predefined install windows.

In prior systems, which have some sort of informational user guide, designers of such systems having, on the order of 100 different functions and parameters, have decided that the typical user will not care about 90% of them. The designers then take the remaining 10 parameters and create an informational guide with them, where the user can change the 10 parameters directly in the guide. In other words, the parameter windows are thrown into the path of the informational guide and the user is asked about and is allowed to set only those 10 parameters which the designers have deemed as the most significant. Thus, prior systems have not allowed the user to access all the parameters and have also not allowed the user to leave the informational guide and go to an already predefined window to access the parameters which also has help and intelligence built in.

Thus, the present invention provides a way in which system parameters may be set, either by an expert user or by a non-expert user.

Figure 19:
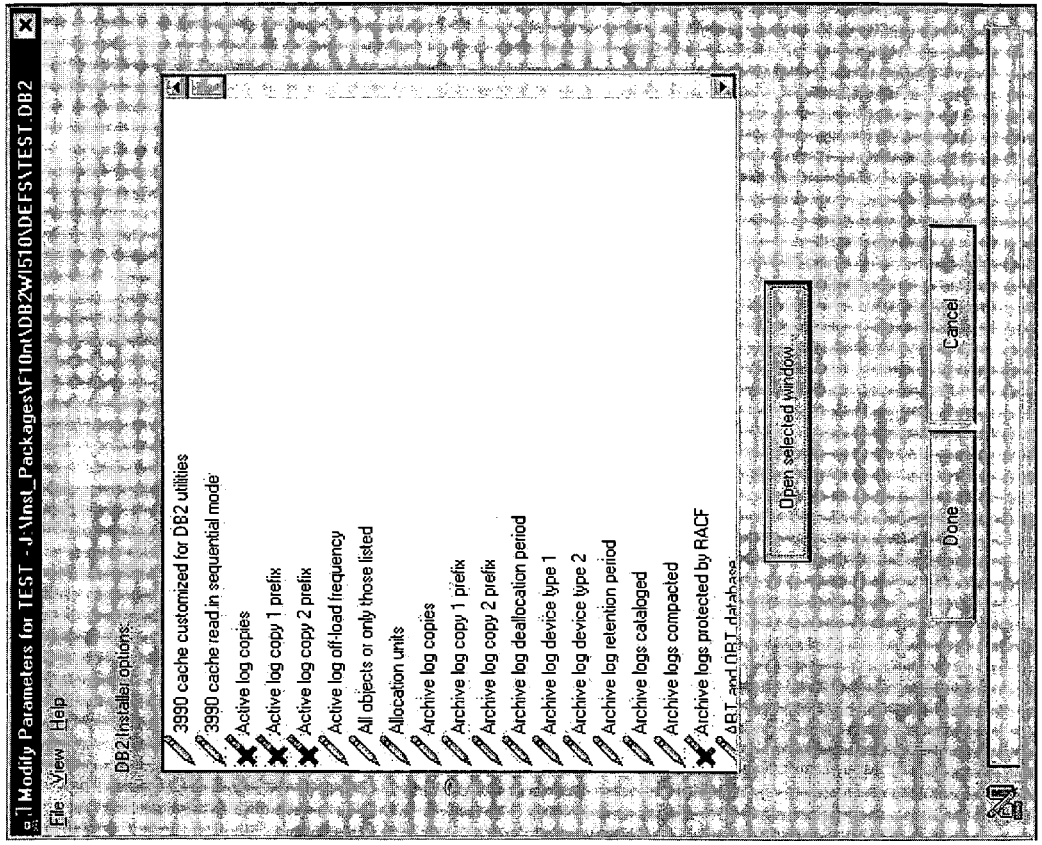
FIG. 19 shows a window listing DB2 Installer options and indicating whether or not the options are modifiable.

Returning to FIG. 4, once the user has completed the "Set up version 5 new function" step, that button is presented with the highlighted border in the manner discussed above. The user may then press the "Modify Migration Options" button, which will cause the window shown in FIG. 19 to be shown to the user. FIG. 19 lists DB2 Installer options along with an icon next to each of the options. The pencil icon indicates that the option is read-write, or modifiable, whereas, the pencil with an "x" icon indicates that the option is read only.

Figure 18:
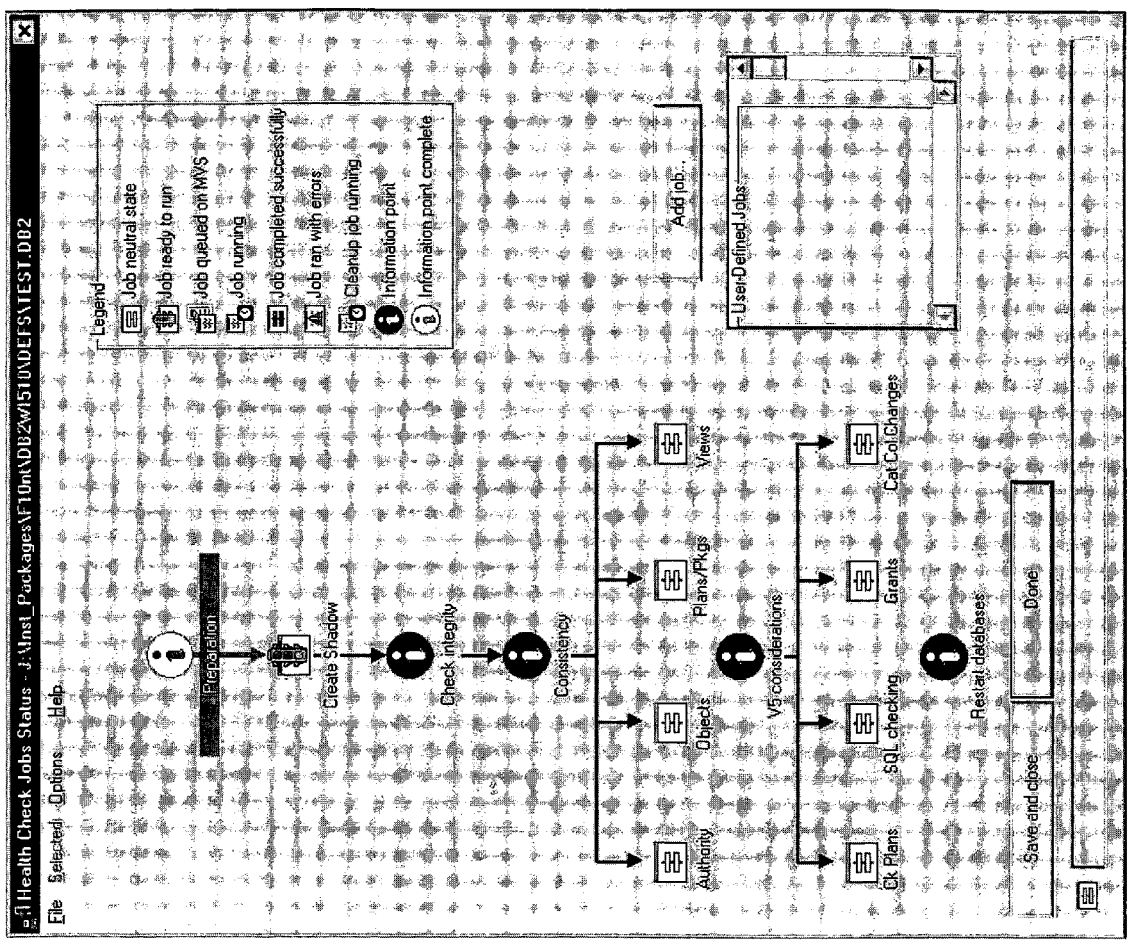
FIG. 18 shows a job status window relating to a test for system health.
Figure 21:
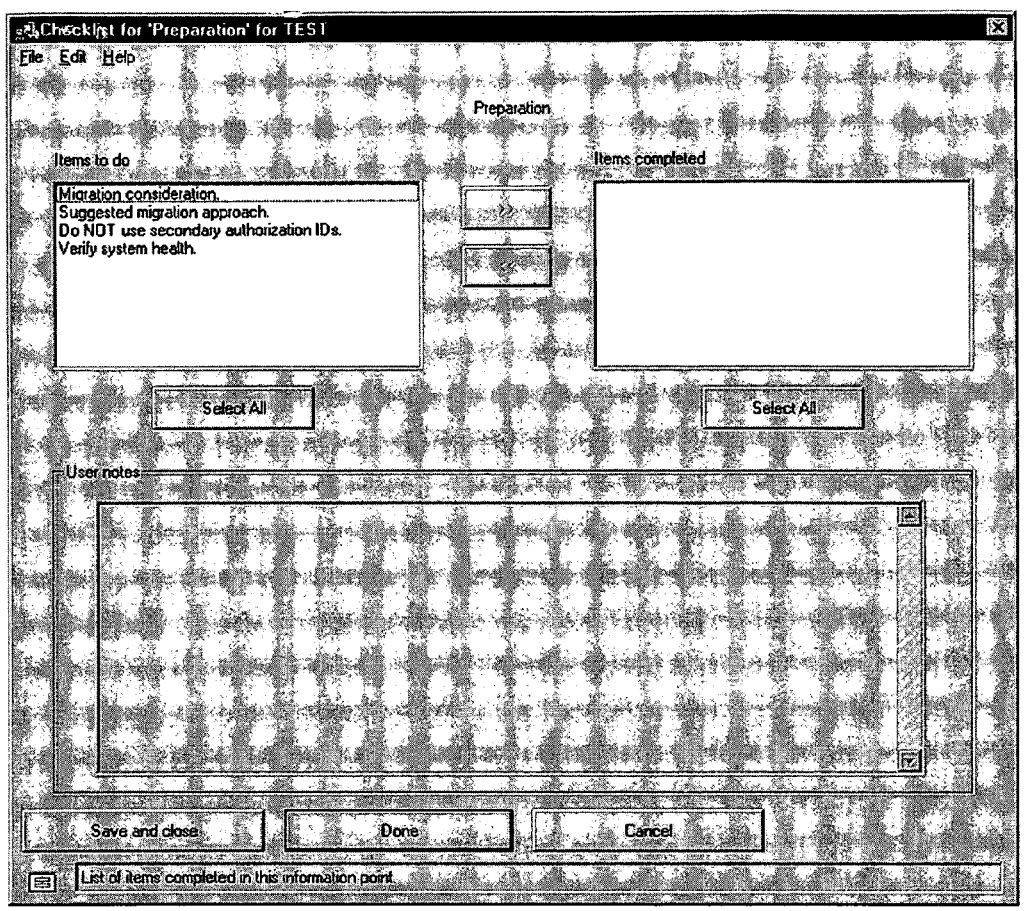
FIG. 21 shows an example of an Info Point window.

When the user clicks on the Done button of FIG. 19, the user is returned to the window of FIG. 4, where the user may click on the "Test DB2 system health" button. If the user chooses to do so, the user is presented with a standard job card (not shown), which the user fills out. After this is done, the user is then presented with the window shown in FIG. 18. FIG. 18 shows a standard job status window, entitled "Health Check Job Status," which contains jobs and information points, such as "Check integrity". The reason for running this health check is that before a user migrates his/her DB2 system, or any other database system, it is wise to check on the health or status of the running DB2 catalog and directory to ensure consistency and a lack of conflicts. It is also wise to know of any changes in the product that could possibly affect any currently running applications. Such information is also apparent from the job status window. DB2 Installer has provided a path within migration, which allows the user to verify the integrity of his/her database catalog and directory. In the Health Check View, shown in FIG. 18, the user is presented with a predefined job, which can divided into smaller jobs. From here the user can edit the jobs, including the job control language (JCL), execute the jobs, or add jobs. A shadow of the DB2 catalog and directory is created and the predefined and edited jobs are run against it to verify the integrity of the database catalog and directory. Any additional jobs added by the user are also executed to verify the integrity of the catalog and directory. This verification controls contention problems on the user's production catalog. DB2 Installer has taken many of the manual steps out for the user and provided a GUI path for the execution of these jobs. Another key component is the help that users receive via the Info Points on the Health Check View, where the Info Points list a series of tasks which the user needs to perform on his/her own. FIG. 21 shows an example of one such Info Point. These contain information and tasks that the user should perform and for which the DB2 Installer is unable to provide a job. While the user should make use of these jobs prior to a migration, most users will find the queries useful after migration as well, and will now have a convenient way to access and execute them.

Figure 20:
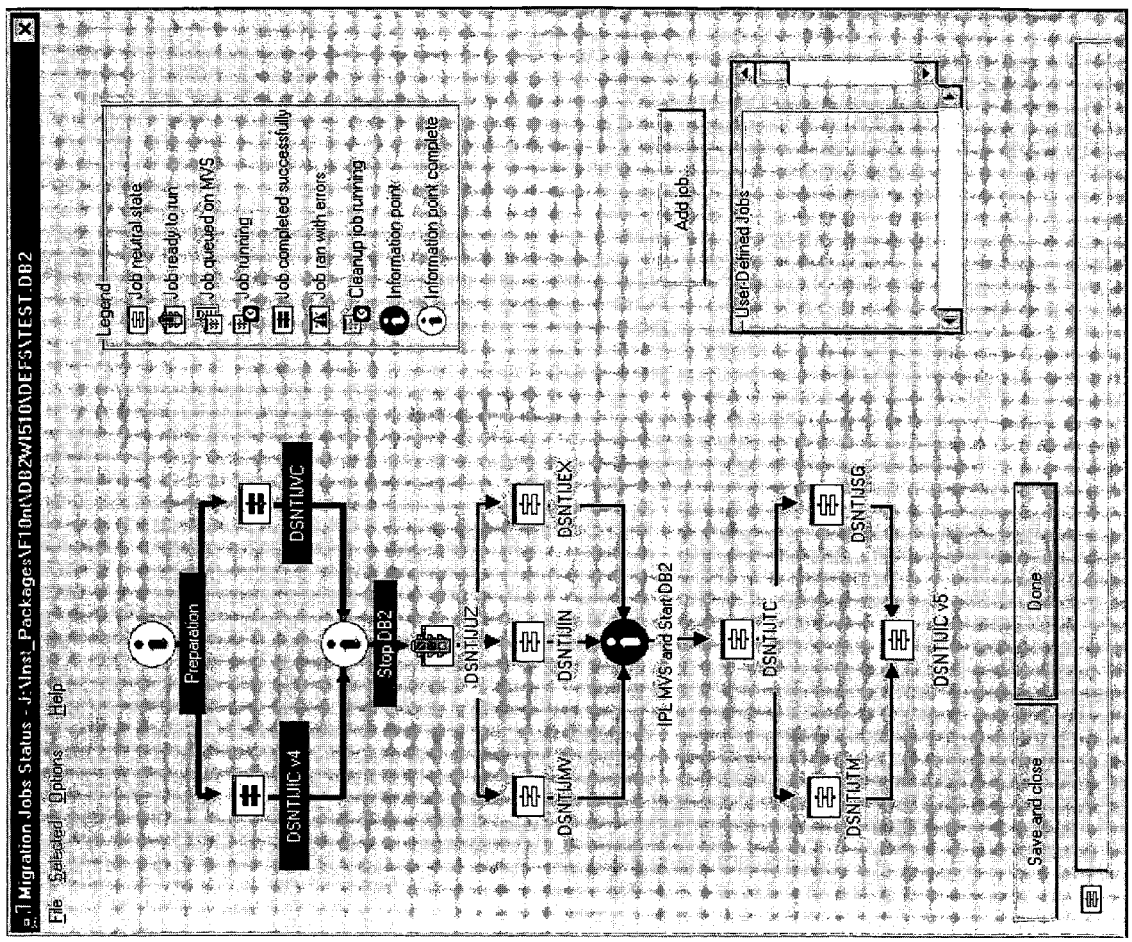
FIG. 20 shows a job status window relating to running jobs.

After completion of the system health test, the user is returned to the window shown in FIG. 4, where the user can click on the button labeled "Generate migration jobs." After jobs are successfully generated, the "Run migration jobs" button, shown in FIG. 4, is enabled. Once the user clicks on this button, the user is presented with a window (not shown) where the user fills out job card information and clicks Continue. The user is then presented with the window shown in FIG. 20 which provides job status. Further details regarding running jobs were discussed above.

Once the migration jobs have been run, the user may verify his/her system by clicking on the "Run version 4 sample jobs" and "Run version 5 sample jobs" buttons, shown in FIG. 4. Once these steps are done, migration is complete.

As noted above, the foregoing discussion has been presented in the context of a migration task. It is to be noted that this discussion applies correspondingly to a user who wishes to perform a load SMPE libraries, install, fallback, remigrate or update task or any other similar tasks. For example, a user performing a fallback task may obtain job status through the continuous polling procedure discussed above. Similarly the fallback user can determine which steps of a task have been completed, can check the integrity of the database system and view the defaults list, all as discussed above.

In addition, DB2 Installer has applied the same GUI concepts, as discussed above, towards the loading of SMPE libraries or other similar preinstall functions. The approach, views, flow and job status indicators are implemented in the same fashion as the rest of DB2 Installer. In prior systems, users were instructed to unload jobs from the tape or cartridge, and edit them manually. The GUI in accordance with the present invention, enables the user to supply input for parameters that is edited into preinstall jobs. Progress and execution of these jobs is handled in the same way as jobs for install, migrate, etc. are handled for a program such as DB2. While the implementation of this in DB2 Installer is specific to DB2, the GUI can be used to accommodate other programs requiring preinstall functions.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for leading a user through a program procedure on a computer to accomplish at least one of loading, installation, migration, fallback, remigration, and update tasks of a program, the method comprising the steps of:
    a) displaying a window to the user providing information regarding parameters of the program; and
    b) transferring the user from the window to a parameter input window associated with one of the parameters selected by the user to be set or changed, wherein the user provides information in the parameter input window to set or change the value of the parameter, the parameter input window being the only location where the parameters need to be set or changed,
    wherein prior to step a), a choice window is displayed to the user, wherein the user is provided with at least two interaction path options, a first one of the interaction path options being a non-expert path and a second one of the interaction path options being an expert path; and
    further wherein, when the user has selected the non-expert path, the window is an information window providing information regarding a parameter of the program.

2. The method according to claim 1, further comprising the step of:
    c) displaying another information window providing information regarding another parameter of the program.

3. The method according to claim 2, wherein the step of displaying another information window comprises returning the user from the parameter input window to the information window associated with the parameter selected to be set or changed by the user and then forwarding the user to the another information window.

4. The method according to claim 1, further comprising the step of:
  c) repeating steps a) and b) for additional information windows in the non-expert path, each of the additional information windows providing information regarding different parameters of the program.

5. The method according to claim 1, wherein, when the user has selected the expert path, the window is an expert window listing any of the parameters of the program which may be modified by the user.

6. The method according to claim 5, further comprising the step of:
  c) after the user provides the information in the parameter input window, returning the user to the expert window.

7. The method according to claim 5, further comprising the step of:
  c) repeating steps a) and b) for each of the parameters selected by the user from the expert window when the user has selected the expert path.

8. The method according to claim 5, further comprising:
  c) after step b), transferring the user from the parameter input window to the information window associated with the parameter, thereby allowing the user to view the information regarding the parameter; and
  d) returning the user to the parameter input window.

9. The method according to claim 1, further comprising the step of preventing the user from selecting to set or change a value of the parameter for at least one of the parameters.

10. The method according to claim 1, wherein a parameter must be modified.

11. The method according to claim 1 wherein the parameters of the program are used by the program for its internal operation.

12. The method according to claim 1 wherein said at least one of said loading, installation, migration, fallback, remigration, and update tasks relate to installing or updating the program within a context of an operating system.

13. A computer system for leading a user through a program procedure to accomplish at least one of loading, installation, migration, fallback, remigration, and update tasks of a computer program, the system comprising:
  a) a workstation, including a display; and
  b) a program for displaying a window to the user on the display providing information regarding parameters of the computer program; and whereupon in response to the user selecting to set or change a value of one of the parameters, the user is transferred from the window to a parameter input window associated with the selected parameter, wherein the user provides information in the parameter input window to set or change the value of the parameter, the parameter input window being the only location where the parameters need to be set or changed,
  wherein prior to displaying the window to the user, a choice window is displayed to the user on the display, wherein in the program, the user is provided with at least two interaction path options, a first one of the interaction path options being a non-expert path and a second one of the interaction path options being an expert path; and
  further wherein, when the user has selected the non-expert path, the window is an information window providing information regarding a parameter of the program.

14. The computer system according to claim 13, wherein another information window is displayed on the display, providing information regarding another parameter of the program.

15. The computer system according to claim 14, wherein in the program, the provision of the additional information windows is accomplished by returning the user from the parameter input window to the information window associated with the parameter selected to be set or changed by the user and then forwarding the user to one of the additional information windows.

16. The computer system according to claim 13, wherein in the program, the user is provided with additional information windows in the non-expert path, each of the additional information windows providing information regarding additional parameters of the program.

17. The computer system according to claim 13, wherein:
  in the program, when the user has selected the expert path, the window is an expert window listing any of the parameters of the program which may be modified by the user.

18. The computer system according to claim 17, wherein, in the program, after the user provides the information in the parameter input window, the user is returned to the expert window.

19. The computer system according to claim 17, wherein in the program, upon returning the user to the expert window, the user may select other parameters from the expert window.

20. The computer system according to claim 17, wherein in the program, the user is transferred from the parameter input window to the information window associated with the parameter, thereby allowing the user to view the information regarding the parameter; and whereupon, the user is returned to the parameter input window.

21. The computer system according to claim 13, wherein the program prevents the user from selecting to set or change a value of the parameter for at least one of the parameters.

22. The computer system according to claim 13, wherein a parameter must be modified.

23. The computer system according to claim 13 wherein the parameters of the computer program are used by the computer program for its internal operation.

24. The computer system according to claim 13 wherein said at least one of said loading, installation, migration, fallback, remigration, and update tasks relate to installing or updating the computer program within a context of an operating system.

25. A computer program to be performed on or with the aid of a computer system for leading a user through a program procedure on a computer to accomplish at least one of loading, installation, migration, fallback, remigration, and update tasks of a further program, the computer program comprising the steps of:
  a) displaying a window to the user providing information regarding parameters of the further program; and
  b) transferring the user from the window to a parameter input window associated with one of the parameters selected by the user to be set or changed, wherein the user provides information in the parameter input window to set or change the value of the parameter, the parameter input window being the only location where the parameters need to be set or changed;
  wherein prior to step a), a choice window is displayed to the user, wherein the user is provided with at least two interaction path options, a first one of the interaction path options being a non-expert path and a second one of the interaction path options being an expert path; and further wherein, when the user has selected the non-expert path, the window is an information window providing information regarding a parameter of the program.

26. The computer program according to claim 25, further comprising the step of:
   c) displaying another information window providing information regarding another parameter of the program.

27. The computer program according to claim 26, wherein the step of displaying another information window comprises returning the user from the parameter input window to the information window associated with the parameter selected to be set or changed by the user and then forwarding the user to the another information window.

28. The computer program according to claim 25, further comprising the step of:
   c) repeating steps a) and b) for additional information windows in the non-expert path, each of the additional information windows providing information regarding different parameters of the program.

29. The computer program according to claim 25, wherein, when the user has selected the expert path, the window is an expert window listing any of the parameters of the program which may be modified by the user.

30. The computer program according to claim 29, further comprising the step of:
   c) after the user provides the information in the parameter input window, returning the user to the expert window.

31. The computer program according to claim 29, further comprising the step of:
   c) repeating steps a) and b) for each of the parameters selected by the user from the expert window when the user has selected the expert path.

32. The computer program according to claim 29, further comprising:
   c) after step b), transferring the user from the parameter input window to the information window associated with the parameter, thereby allowing the user to view the information regarding the parameter; and
   d) returning the user to the parameter input window.

33. The computer program according to claim 25, further comprising the step of preventing the user from selecting to set or change a value of the parameter for at least one of the parameters.

34. The computer program according to claim 25, wherein a parameter must be modified.

35. The computer program according to claim 25 wherein the parameters of the further program are used by the further program for its internal operation.

36. The computer program according to claim 25 wherein said at least one of said loading, installation, migration, fallback, remigration, and update tasks relate to installing or updating the computer program within a context of an operating system.

37. A computer-readable medium containing a program for performing the method of leading a user through a program procedure on a computer to accomplish at least one of loading, installation, migration, fallback, remigration, and update tasks of a computer program, comprising the steps of:
   a) displaying a window to the user providing information regarding parameters of the computer program; and
   b) transferring the user from the window to a parameter input window associated with one of the parameters selected by the user to be set or changed, wherein the user provides information in the parameter input window to set or change the value of the parameter, the parameter input window being the only location where the parameters need to be set or changed;
   wherein prior to step a), a choice window is displayed to the user, wherein the user is provided with at least two interaction path options, a first one of the interaction path options being a non-expert path and a second one of the interaction path options being an expert path; and
   further wherein, when the user has selected the non-expert path, the window is an information window providing information regarding a parameter of the program.

38. The computer-readable medium according to claim 37, further comprising the step of:
   c) displaying another information window providing information regarding another parameter of the program.

39. The computer-readable medium according to claim 38, wherein the step of displaying another information window comprises returning the user from the parameter input window to the information window associated with the parameter selected to be set or changed by the user and then forwarding the user to the another information window.

40. The computer-readable medium according to claim 37, further comprising the step of:
   c) repeating steps a) and b) for additional information windows in the non-expert path, each of the additional information windows providing information regarding different parameters of the program.

41. The computer-readable medium according to claim 37, wherein, when the user has selected the expert path, the window is an expert window listing any of the parameters of the program which may be modified by the user.

42. The computer-readable medium according to claim 41, further comprising the step of:
   c) after the user provides the information in the parameter input window, returning the user to the expert window.

43. The computer-readable medium according to claim 41, further comprising the step of:
   c) repeating steps a) and b) for each of the parameters selected by the user from the expert window when the user has selected the expert path.

44. The computer-readable medium according to claim 41, further comprising:
   c) after step b), transferring the user from the parameter input window to the information window associated with the parameter, thereby allowing the user to view the information regarding the parameter; and
   d) returning the user to the parameter input window.

45. The computer-readable medium according to claim 37, further comprising the step of preventing the user from selecting to set or change a value of the parameter for at least one of the parameters.

46. The computer-readable medium according to claim 37, wherein a parameter must be modified.

47. The computer-readable medium according to claim 37 wherein the parameters of the computer program are used by the computer program for its internal operation.

48. The computer-readable medium according to claim 37 wherein said at least one of said loading, installation, migration, fallback, remigration, and update tasks relate to installing or updating the further program within a context of an operating system.

* * * * *